(12) United States Patent
Karmi

(10) Patent No.: US 12,100,067 B2
(45) Date of Patent: Sep. 24, 2024

(54) SYSTEMS AND METHODS FOR USER PERSONA MANAGEMENT IN APPLICATIONS WITH VIRTUAL CONTENT

(71) Applicant: QUALCOMM Incorporated, San Diego, CA (US)

(72) Inventor: Gad Karmi, Davis, CA (US)

(73) Assignee: QUALCOMM Incorporated, San Diego, CA (US)

( * ) Notice: Subject to any disclaimer, the term of this patent is extended or adjusted under 35 U.S.C. 154(b) by 101 days.

(21) Appl. No.: 17/844,572

(22) Filed: Jun. 20, 2022

(65) Prior Publication Data

US 2023/0410378 A1    Dec. 21, 2023

(51) Int. Cl.
*G06T 11/00*    (2006.01)
*G06F 3/14*    (2006.01)
*G06V 40/16*    (2022.01)

(52) U.S. Cl.
CPC .............. *G06T 11/00* (2013.01); *G06F 3/14* (2013.01); *G06V 40/174* (2022.01)

(58) Field of Classification Search
None
See application file for complete search history.

(56) References Cited

U.S. PATENT DOCUMENTS

| | | | |
|---|---|---|---|
| 9,652,134 B2 * | 5/2017 | Goossens | G06Q 50/01 |
| 11,282,278 B1 | 3/2022 | Zavesky et al. | |
| 2011/0148864 A1 * | 6/2011 | Lee | G06V 40/16 |
| | | | 345/419 |
| 2017/0069124 A1 * | 3/2017 | Tong | G06T 17/20 |
| 2018/0300916 A1 | 10/2018 | Barnett et al. | |
| 2021/0005003 A1 * | 1/2021 | Chong | G06T 17/205 |

OTHER PUBLICATIONS

Partial International Search Report—PCT/US2023/067934—ISA/EPO—Sep. 13, 2023.
International Search Report and Written Opinion—PCT/US2023/067934—ISA/EPO—Nov. 6, 2023.

* cited by examiner

*Primary Examiner* — Edward Martello
(74) *Attorney, Agent, or Firm* — QUALCOMM Incorporated

(57) ABSTRACT

User persona management systems and techniques are described. A system identifies a profile associated with a first user. The profile includes data defining avatars that each represent the first user and conditions for displaying respective avatars. The system determines, based on characteristics associated with the first user, that at least a first condition is met. The system selects, based on determining that at least the first condition is met, a display avatar of the avatars. The system outputs the display avatar for presentation to a second user, for instance by displaying the display avatar on a display and/or by transmitting the display avatar to a user device associated with the second user. The display avatar can be presented in accordance with the characteristics associated with the first user.

32 Claims, 13 Drawing Sheets

SYSTEMS AND METHODS FOR USER PERSONA MANAGEMENT IN APPLICATIONS WITH VIRTUAL CONTENT

FIELD

This application is related to user persona management. More specifically, this application relates to systems and methods of user persona management in applications with virtual content, such as extended reality environments or metaverse environments, to select different avatars to display based on different characteristics and situations.

BACKGROUND

Network-based interactive systems allow users to interact with one another over a network, in some cases even when those users are geographically remote from one another. Network-based interactive systems can include video conferencing technologies. In a video conference, each user connects through a user device that captures video and/or audio of the user and sends the video and/or audio to the other users in the video conference, so that each of the users in the video conference can see and hear one another. Network-based interactive systems can include network-based multiplayer games, such as massively multiplayer online (MMO) games. Network-based interactive systems can include extended reality (XR) technologies, such as virtual reality (VR) or augmented reality (AR). At least a portion of an XR environment displayed to a user of an XR device can be virtual, in some examples including representations of other users that the user can interact with in the XR environment.

In some examples, network-based interactive systems may use cameras to obtain image data of a user and/or portions of the real-world environment that the user is in. In some examples, network-based interactive systems send this image data to other users. However, sending of image data that may include representations of users and/or of other persons in an environment raises privacy concerns, as some of those persons might not want for an image of them to be captured and/or shared publicly and/or with certain users.

SUMMARY

In some examples, systems and techniques are described for user persona management. User persona management systems and techniques are described. A user persona management system identifies a profile associated with a first user, for instance based on identifying the first user in an image. The profile includes data defining a plurality of avatars that each represent the first user and one or more conditions for displaying respective avatars of the plurality of avatars. The user persona management system determines, based on one or more characteristics associated with the first user, that at least a first condition of the one or more conditions is met. The user persona management system selects, based on determining that at least the first condition is met, a display avatar of the plurality of avatars. The user persona management system outputs the display avatar for presentation to a second user, for instance by modifying an image to use the display avatar in place of the first user. The display avatar is to be presented in accordance with the one or more characteristics associated with the first user.

In one example, an apparatus for media processing is provided. The apparatus includes a memory and one or more processors (e.g., implemented in circuitry) coupled to the memory. The one or more processors are configured to and can: identify a profile associated with a first user, wherein the profile includes data defining a plurality of avatars that each represent the first user and one or more conditions for displaying respective avatars of the plurality of avatars; select a display avatar of the plurality of avatars based on a first condition of the one or more conditions, wherein the first condition is associated with one or more characteristics associated with the first user; and output the display avatar for presentation to a second user, wherein the display avatar is to be presented in accordance with the one or more characteristics associated with the first user.

In another example, a method of image processing is provided. The method includes: $ identifying a profile associated with a first user, wherein the profile includes data defining a plurality of avatars that each represent the first user and one or more conditions for displaying respective avatars of the plurality of avatars; selecting a display avatar of the plurality of avatars based on a first condition of the one or more conditions, wherein the first condition is associated with one or more characteristics associated with the first user; and outputting the display avatar for presentation to a second user, wherein the display avatar is to be presented in accordance with the one or more characteristics associated with the first user.

In another example, a non-transitory computer-readable medium is provided that has stored thereon instructions that, when executed by one or more processors, cause the one or more processors to: identify a profile associated with a first user, wherein the profile includes data defining a plurality of avatars that each represent the first user and one or more conditions for displaying respective avatars of the plurality of avatars; select a display avatar of the plurality of avatars based on a first condition of the one or more conditions, wherein the first condition is associated with one or more characteristics associated with the first user; and output the display avatar for presentation to a second user, wherein the display avatar is to be presented in accordance with the one or more characteristics associated with the first user.

In another example, an apparatus for image processing is provided. The apparatus includes: means for identifying a profile associated with a first user, wherein the profile includes data defining a plurality of avatars that each represent the first user and one or more conditions for displaying respective avatars of the plurality of avatars; means for selecting a display avatar of the plurality of avatars based on a first condition of the one or more conditions, wherein the first condition is associated with one or more characteristics associated with the first user; and means for outputting the display avatar for presentation to a second user, wherein the display avatar is to be presented in accordance with the one or more characteristics associated with the first user.

In some aspects, the one or more characteristics associated with the first user includes an identity of the second user that the display avatar is to be presented to, wherein the first condition corresponds to whether the identity of the second user is identified in a predetermined data structure corresponding to the first user. In some aspects, the one or more characteristics associated with the first user includes a category of relationship between the second user that the display avatar is to be presented to and the first user, wherein the first condition corresponds to whether the category of relationship is identified in a predetermined data structure corresponding to the first user.

In some aspects, the one or more characteristics associated with the first user includes a location of the first user in an environment, wherein the first condition corresponds to whether the location of the first user in the environment falls within at least one of a predetermined area, a predetermined area type, or a predetermined environment type in the environment identified in a predetermined data structure corresponding to the first user. In some aspects, the one or more characteristics associated with the first user includes an activity performed by the first user, wherein the first condition corresponds to whether the activity is identified in a predetermined data structure corresponding to the first user.

In some aspects, identifying the profile associated with the first user includes identifying the profile associated with the first user based on one or more communications from a user device associated with the first user.

In some aspects, one or more of the methods, apparatuses, and computer-readable medium described above further comprise: identifying a second profile associated with a third user, wherein the second profile includes data defining a second plurality of avatars that each represent the third user and a second set of one or more conditions for displaying respective avatars of the second plurality of avatars; selecting a second display avatar of the second plurality of avatars based on a second condition of the second set of one or more conditions, wherein the second condition is associated with a second set of one or more characteristics associated with the second user; and outputting the second display avatar for presentation to the second user, wherein the second display avatar is to be presented in accordance with the second set of one or more characteristics associated with the third user.

In some aspects, one or more of the methods, apparatuses, and computer-readable medium described above further comprise: identifying a second profile associated with a third user, wherein the second profile includes data defining a second plurality of avatars that each represent the third user and a second set of one or more conditions for displaying respective avatars of the second plurality of avatars; selecting a second display avatar of the second plurality of avatars based on none of the second set of one or more conditions being met; and outputting the second display avatar for presentation to the second user.

In some aspects, one or more of the methods, apparatuses, and computer-readable medium described above further comprise: receiving an image of an environment; detecting at least a portion of the first user in the image, wherein identifying the profile associated with the first user is based on at least the portion of the first user being detected in the image; and generating a modified image at least in part by modifying the image to use the display avatar in place of at least the portion of the first user in the image according to the one or more characteristics of the first user, wherein outputting the display avatar for presentation to the second user includes outputting the modified image for presentation to the second user. In some aspects, at least a portion of the environment in the image includes one or more virtual elements. In some aspects, at least a portion of the image of the environment is captured by an image sensor. In some aspects, generating the modified image includes using the display avatar and at least the portion of the first user in the image as inputs to a trained machine learning model that modifies the image to use the display avatar in place of at least the portion of the first user according to the one or more characteristics of the first user.

In some aspects, the portion of the first user includes one or more facial features of the first user. In some aspects, identifying the profile associated with the first user includes identifying an identity of the one or more facial features of the first user in the image using facial recognition.

In some aspects, one or more of the methods, apparatuses, and computer-readable medium described above further comprise: before outputting the display avatar for presentation to the second user, modifying the display avatar based on one or more display preferences associated with the second user.

In some aspects, one or more of the methods, apparatuses, and computer-readable medium described above further comprise: selecting a second display avatar of the plurality of avatars based on a change from the first condition to a second condition of the one or more conditions; and transitioning from outputting the display avatar for presentation to the second user to outputting the second display avatar for presentation to the second user, wherein the second display avatar is to be presented in accordance with the one or more characteristics associated with the first user.

In some aspects, one or more of the methods, apparatuses, and computer-readable medium described above further comprise: generating the display avatar before outputting the display avatar for presentation to the second user, wherein generating the display avatar includes providing one or more inputs associated with the first user to a trained machine learning model that generates the display avatar based on the one or more inputs associated with the first user.

In some aspects, one or more of the methods, apparatuses, and computer-readable medium described above further comprise: identifying a facial expression of the first user; and modifying the display avatar to apply the facial expression to the display avatar before outputting the display avatar for presentation to the second user.

In some aspects, one or more of the methods, apparatuses, and computer-readable medium described above further comprise: identifying a head pose of the first user; and modifying the display avatar to apply the head pose to the display avatar before outputting the display avatar for presentation to the second user.

In some aspects, one or more of the methods, apparatuses, and computer-readable medium described above further comprise: identifying a lighting condition of the first user; and modifying the display avatar to apply the lighting condition to the display avatar before outputting the display avatar for presentation to the second user.

In some aspects, one or more of the methods, apparatuses, and computer-readable medium described above further comprise: causing the display avatar to be displayed using a display. In some aspects, one or more of the apparatuses include the display. In some aspects, one or more of the methods, apparatuses, and computer-readable medium described above further comprise: causing the display avatar to be transmitted to at least a user device associated with the second user using at least a communication interface. In some examples, one or more of the apparatuses include the communication interface.

In some aspects, one or more of the apparatuses include at least one of a head-mounted display (HMD), a mobile handset, or a wireless communication device. In some aspects, one or more of the methods, apparatuses, and computer-readable medium described above further comprise: outputting the display avatar for presentation to the second user at least in part by transmitting the display avatar to a user device associated with the second user. In some aspects, one or more of the apparatuses include one or more network servers.

In some aspects, the apparatus is part of, and/or includes a wearable device, an extended reality device (e.g., a virtual reality (VR) device, an augmented reality (AR) device, or a mixed reality (MR) device), a head-mounted display (HMD)

device, a wireless communication device, a mobile device (e.g., a mobile telephone and/or mobile handset and/or so-called "smart phone" or other mobile device), a camera, a personal computer, a laptop computer, a server computer, a vehicle or a computing device or component of a vehicle, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following drawing figures.

DETAILED DESCRIPTION

Figure 1:
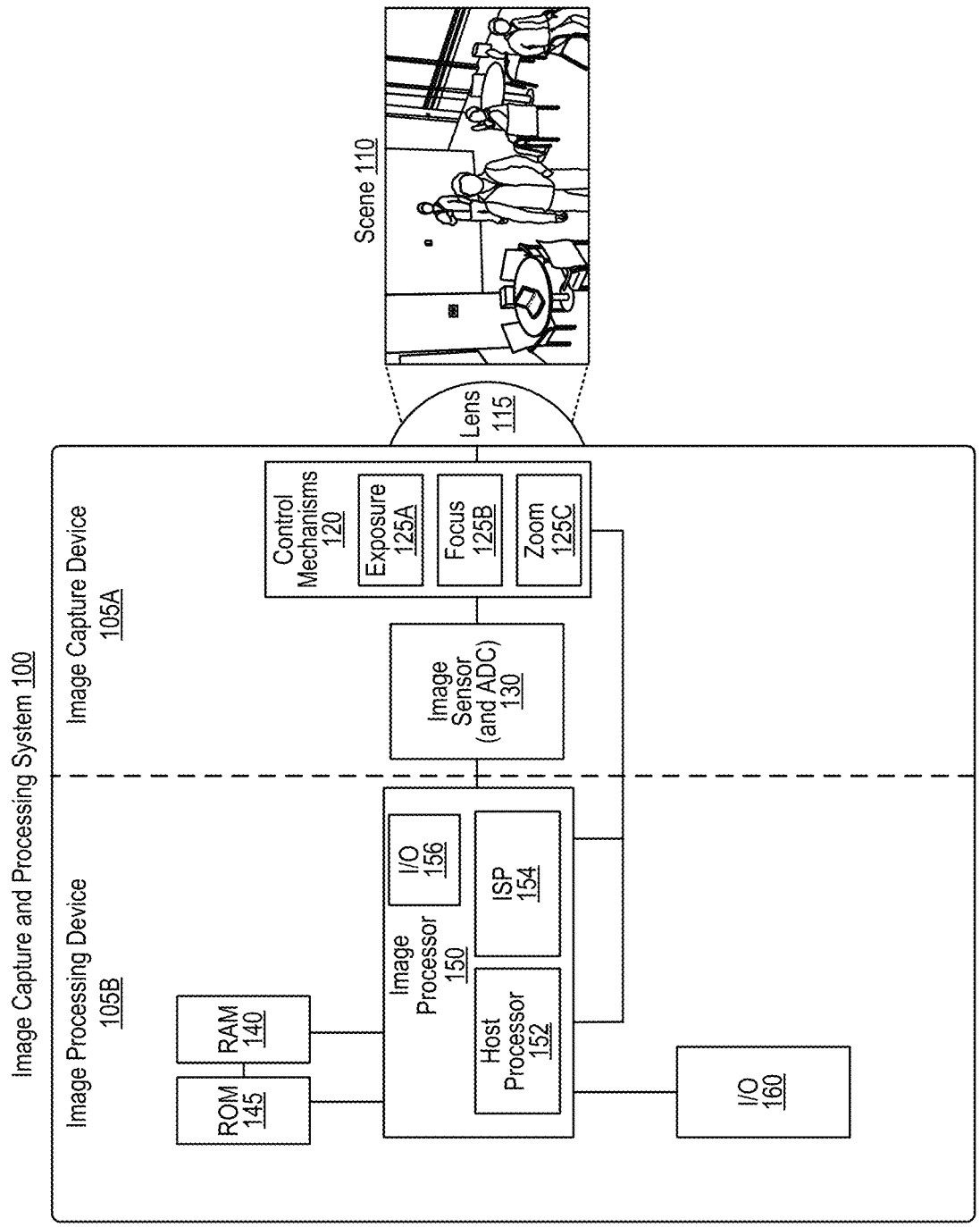
FIG. 1 is a block diagram illustrating an example architecture of an image capture and processing system, in accordance with some examples.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

A camera is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

Extended reality (XR) systems or devices can provide virtual content to a user and/or can combine real-world views of physical environments (scenes) and virtual environments (including virtual content). XR systems facilitate user interactions with such combined XR environments. The real-world view can include real-world objects (also referred to as physical objects), such as people, vehicles, buildings, tables, chairs, and/or other real-world or physical objects. XR systems or devices can facilitate interaction with different types of XR environments (e.g., a user can use an XR system or device to interact with an XR environment). XR systems can include virtual reality (VR) systems facilitating interactions with VR environments, augmented reality (AR) systems facilitating interactions with AR environments, mixed reality (MR) systems facilitating interactions with MR environments, and/or other XR systems. Examples of XR systems or devices include head-mounted displays (HMDs), smart glasses, among others. In some cases, an XR system can track parts of the user (e.g., a hand and/or fingertips of a user) to allow the user to interact with items of virtual content.

Video conferencing is a network-based technology that allows multiple users, who may each be in different locations, to connect in a video conference over a network using respective user devices that generally each include displays and cameras. In video conferencing, each camera of each user device captures image data representing the user who is using that user device, and sends that image data to the other user devices connected to the video conference, to be displayed on the display of the other users who use those other user devices. Meanwhile, the user device displays image data representing the other users in the video conference, captured by the respective cameras of the other user devices that those other users use to connect to the video conference. Video conferencing can be used by a group of users to virtually speak face-to-face while users are in different locations. Video conferencing can be a valuable way to users to virtually meet with each other despite travel restrictions, such as those related to a pandemic. Video conferencing can be performed using user devices that connect to each other, in some cases through one or more servers. In some examples, the user devices can include laptops, phones, tablet computers, mobile handsets, video game consoles, vehicle computers, desktop computers, wearable devices, televisions, media centers, XR systems, or other computing devices discussed herein.

Network-based interactive systems allow users to interact with one another over a network, in some cases even when those users are geographically remote from one another. Network-based interactive systems can include video conferencing technologies such as those described above. Network-based interactive systems can include extended reality (XR) technologies, such as those described above. At least a portion of an XR environment displayed to a user of an XR device can be virtual, in some examples including representations of other users that the user can interact with in the XR environment. Network-based interactive systems can include network-based multiplayer games, such as massively multiplayer online (MMO) games. Network-based interactive systems can include network-based interactive environment, such as "metaverse" environments.

In some examples, network-based interactive systems may use sensors to capture sensor data and obtain, in the sensor data, representation(s) of user and/or portions of the real-world environment that the user is in. For instance, the network-based interactive systems may use cameras (e.g., image sensors of cameras) to capture image data and obtain, in the image data, depiction(s) of a user and/or portions of the real-world environment that the user is in. In some examples, network-based interactive systems send this sensor data (e.g., image data) to other users. However, sending of sensor data (e.g., image data) that may include representations of users and/or of other persons in an environment raises privacy concerns, as some of those persons might not want for representation(s) of them (e.g., of their faces and/or other portion(s) of their respective bodies) to be captured and/or shared by the network-based interactive systems (e.g., shared publicly, shared with specific users, etc.). For instance, a user may be using a network-based interactive system outdoors, in a coffeeshop, in a store, at home, at an office, or at a school. In each of these cases, the sensor(s) of the network-based interactive system may end up capturing sensor data with representations of the user and/or other persons other than the user. For instance, those other persons may end up walking into the field of view of the sensor(s), or the field of view of the sensor(s) may move (e.g., as the user moves their head while wearing an HMD that is part of the network-based interactive system) to include the others persons. For certain persons, such as children, privacy laws in certain countries or regions may prohibit or otherwise regulate image capture and/or sharing using such network-based interactive systems. In some network-based interactive systems, such as those including head-mounted display (HMD) devices, it may be difficult for a user to control the field of view of camera(s) and/or other sensor(s) to prevent capture of sensor data with representations of other persons. In some cases, the user himself/herself may not want his/her own image (or other representation) to be shared using a network-based interactive system, for instance if the user has not yet finished getting ready for the day, is having a bad hair day, is feeling sick or unwell, is feeling tired or sleepy, is wearing an outfit (e.g., pajamas or gym clothes) that they would prefer not to allow other users see them wearing, is eating while using the network-based interactive system, or some combination thereof.

In some examples, network-based interactive systems may modify the image data to protect the privacy of the user and/or other persons who are depicted or otherwise represented in the image data. In some examples, a network-based interactive system may blur, pixelate, or cover a person's face in the image to protect the privacy of the person. However, while this may protect privacy, this can break immersion for the user of the network-based interactive system, and can prevent facial expression(s) and/or other expressivity from the person from being visible to the user. Furthermore, blurring and pixelation can produce imperfect privacy and thus can represent a security risk, since image sharpening techniques can sometimes be used to recreate a person's face from a blurred or pixelated image.

In some examples, systems and techniques are described for image processing. An imaging system identifies a profile associated with a first user. For instance, the imaging system can identify the profile associated with the first user based on receiving an image of an environment and detecting at least a portion (e.g., one or more facial features) of the first user in the image. The profile includes data defining a plurality of avatars that each represent the first user and one or more conditions for displaying respective avatars of the plurality of avatars. The imaging system determines, based on one or more characteristics associated with the first user, that at least a first condition of the one or more conditions is met. The imaging system selects, based on determining that at least the first condition is met, a display avatar of the plurality of avatars. The imaging system outputs the display avatar for presentation to a second user. The display avatar is to be presented in accordance with the one or more characteristics associated with the first user. For instance, the imaging system can output the display avatar for presentation to the second user at least in part by modifying the image of the environment to use the display avatar in place of at least the portion of the first user, and outputting the modified image for presentation to the second user.

In some examples, the first condition may be related to an identity of the second user and/or a type of relationship between the first user and the second user. For instance, the first user may wish to look one way to friends and/or family (e.g., their true appearance or a realistic avatar), and a different way to strangers. In some examples, the first condition may be related to a location of the first user and/or the second user in an environment (e.g., in the real world and/or in an environment that is at least partially virtual). For instance, the first user may wish to look one way while in a "home" environment (e.g., their true appearance or a realistic avatar), and a different way in other environments. In some examples, the first condition may be related to an activity being performed by the first user and/or the second user in an environment (e.g., in the real world and/or in an environment that is at least partially virtual). For instance, the first user may wish to look one way while attending a concert or sports game (e.g., an avatar associated with the artist or sports team), and a different way in other environments (e.g., a more neutral avatar).

In some examples, the profile of the first user may include an approved list (whitelist) of conditions for which a certain avatar is to be used, for instance indicating certain approved identities for the second user, approved relationships between the first user and the second user, approved location(s) of the first user and/or the second user, approved activities by the first user and/or the second user, or combinations thereof. In some examples, the profile of the first user may include a blocked list (blacklist) of conditions for which a certain avatar is not to be used, for instance indicating certain blocked identities for the second user, blocked relationships between the first user and the second user, blocked location(s) of the first user and/or the second user, blocked activities by the first user and/or the second user, or combinations thereof. In some examples, the profile of the first user may include both approved lists (whitelists) of conditions and blocked lists (blacklists) of conditions.

In some examples, the profile of the second user may include further modifications to how avatars are presented to the second user. For example, if the second user is colorblind, then the modifications may modify the avatars to avoid certain colors or color schemes, to replace certain colors with alternate colors, and the like. If the second user likes or dislikes a certain color, the modifications may modify the avatars to use or to remove that color, respectively.

The imaging systems and techniques described herein provide a number of technical improvements over prior imaging systems. For instance, the imaging systems and techniques described herein provide increased privacy and security for network-based interactive systems and/or other imaging systems at least in part by alternate representations (e.g., avatars) for persons represented in sensor data. The imaging systems and techniques described herein provide increased immersion, and/or do not detract from immersion, compared to other privacy-enhancing techniques such as face blurring, face pixelization, covering faces with black boxes, and the like. The imaging systems and techniques described herein provide increased flexibility, customization, and personalization, as users are able to indicate how they are to be represented to other users under various conditions. The imaging systems and techniques described herein provide increased flexibility and expressivity, as users are able to customize avatars for different conditions and/or convey expressions (e.g., facial expression, gestures) through their avatars.

Various aspects of the application will be described with respect to the figures. FIG. 1 is a block diagram illustrating an architecture of an image capture and processing system 100. The image capture and processing system 100 includes various components that are used to capture and process images of one or more scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130. In some examples, the scene 110 is a scene in an environment. In some examples, the scene 110 is a scene of at least a portion of a user. For instance, the scene 110 can be a scene of one or both of the user's eyes, and/or at least a portion of the user's face.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo, thereby adjusting focus. In some cases, additional lenses may be included in the system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 1010 discussed with respect to the computing system 1000. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140 and/or 1020, read-only memory (ROM) 145 and/or 1025, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1035, any other input devices 1045, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the system 100 and one or more peripheral devices, over which the system 100 may receive data from the one or more peripheral device and/or transmit data to the one or more peripheral devices. The I/O 160 may include one or more wireless transceivers that enable a wireless connection between the system 100 and one or more peripheral devices, over which the system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 1002.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2A:
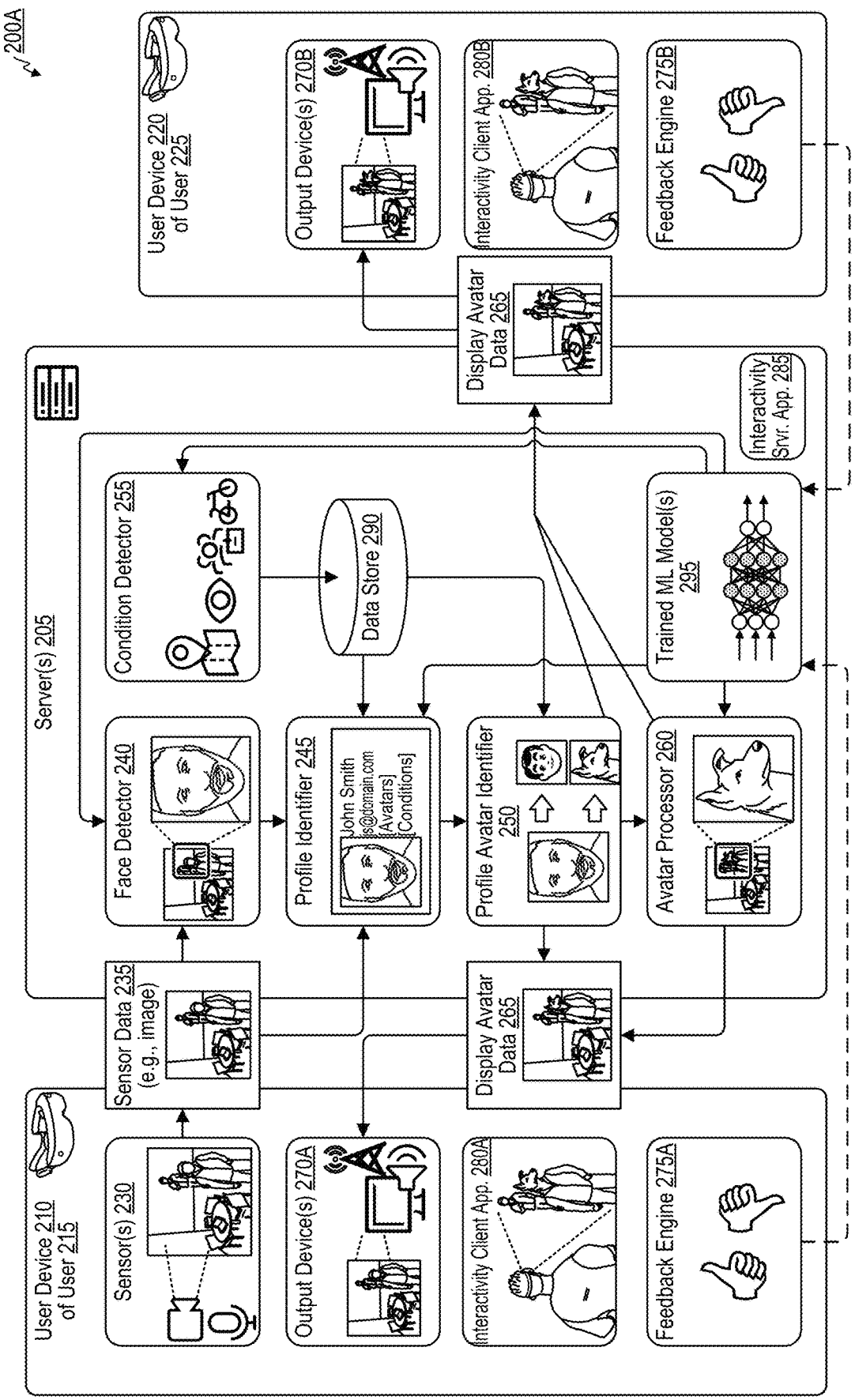
FIG. 2A is a block diagram illustrating an example architecture of imaging process performed by an imaging system with one or more servers and two user devices, in accordance with some examples.

FIG. 2A is a block diagram illustrating an example architecture of imaging process performed by an imaging system 200A with one or more servers 205 and two user devices. In particular, the imaging system 200A includes one or more servers 205, a user device 210 associated with a user 215, and a user device 220 associated with a user 225. Each of the server(s) 205, the user device 210, and/or the user device 220 can include at least one computing system 1000. Each of the server(s) 205, the user device 210, and/or the user device 220 can include, for instance, one or more laptops, phones, tablet computers, mobile handsets, video game consoles, vehicle computers, desktop computers, wearable devices, televisions, media centers, XR systems, head-mounted display (HMD) devices, other types of computing devices discussed herein, or combinations thereof. In some examples, the user device 210 includes component(s) illustrated and/or described herein as included in the user device 220. In some examples, the user device 210 can perform operation(s) illustrated and/or described herein as performed by the user device 220. In some examples, the user device 220 includes component(s) illustrated and/or described herein as included in the user device 210. In some examples, the user device 220 can perform operation(s) illustrated and/or described herein as performed by the user device 210. In some examples, the user device 210 and/or user device 220 include component(s) illustrated and/or described herein as included in the server(s) 205. In some examples, the user device 210 and/or user device 220 can perform operation(s) illustrated and/or described herein as performed by the server(s) 205. In some examples, the server(s) 205 include component(s) illustrated and/or described herein as included in the user device 210 and/or user device 220. In some examples, the server(s) 205 can perform operation(s) illustrated and/or described herein as performed by the user device 210 and/or user device 220.

The imaging system 200A, and the corresponding imaging process, can be used in network-based interactive system applications, such as those for video conferencing, extended reality (XR), video gaming, metaverse environments, or combinations thereof. For instance, the user device 210 includes an interactivity client application 280A, the user device 220 includes an interactivity client application 280B, and the server 205 includes an interactivity server application 285. In some examples, the interactivity client application 280A and the interactivity client application 280B can be client instances of a software application for network-based interactive system applications, such as those for video conferencing, extended reality (XR), video gaming, metaverse environments, or combinations thereof. In some examples, the interactivity server application 285 can be a server instance of a software application for network-based interactive system applications, such as those for video conferencing, extended reality (XR), video gaming, metaverse environments, or combinations thereof. In some examples, the interactivity client application 280A, the interactivity client application 280B, and/or the interactivity server application 285 can generate virtual environments, virtual elements to incorporate into real-world environments (e.g., as represented in image data captured using the sensor(s) 230), or a combination thereof. In some examples, a representation of the user 215 and/or a representation of user 225 are positioned within, and/or are able to move throughout, an environment that is at least partially virtual, with the virtual elements of the environment generated using the interactivity client application 280A, the interactivity client application 280B, and/or the interactivity server application 285. For instance, the environment that is at least partially virtual can be an environment of a video game, a VR environment, an AR environment, an MR environment, an XR environment, a metaverse environment, video conferencing environment, teleconferencing environment, or a combination thereof. Within FIG. 2A, a graphic representing the interactivity client application 280A and the interactivity client application 280B illustrates a user (e.g., the user 215 or the user 225) wearing an HMD device (e.g., the user device 210 or the user device 220) and seeing representations (e.g., virtual representations) of two people (e.g., the two people depicted in the sensor data 235 and/or the display avatar data 265) in an XR environment (e.g., which may be at least partially virtual). The XR environment can be at least partially generated using the interactivity client application 280A, the interactivity client application 280B, and/or the interactivity server application 285.

The user device 210 of the user 215 includes one or more sensors 230. In some examples, the sensor(s) 230 include one or more image sensors or one or more cameras. The image sensor(s) capture image data that can include one or more images, one or more videos, portions thereof, or combinations thereof. In some examples, at least one of the sensor(s) 230 can be directed toward the user 215 (e.g., can face toward the user 215), and can thus capture sensor data (e.g., image data) of (e.g., depicting or otherwise representing) at least portion(s) of the user 215. In some examples, at least one of the sensor(s) 230 can be directed away from the user 215 (e.g., can face away from the user 215) and/or toward an environment that the user 215 is in, and can thus capture sensor data (e.g., image data) of (e.g., depicting or otherwise representing) at least portion(s) of the environment. In some examples, sensor data captured by at least one of the sensor(s) 230 that is directed away from the user 215 and/or toward the can have a field of view (FoV) that includes, is included by, overlaps with, and/or otherwise corresponds to, a FoV of the eyes of the user 215. Within FIG. 2A, a graphic representing the sensor(s) 230 illustrates the sensor(s) 230 as including a camera facing an environment with two people in it.

In some examples, the sensor(s) 230 capture sensor data measuring and/or tracking information about aspects of the user 215's body and/or behaviors by the user 215 (e.g., characteristics of the user 215). In some examples, the sensors 230 include one or more image sensors of one or more cameras that face at least a portion of the user (e.g., at least a portion of the face and/or head of the user 215). The one or more cameras can include one or more image sensors that capture image data including one or more images of at least a portion of the user 215. For instance, the sensors 230 can include one or more image sensors focused on one or both eyes (and/or eyelids) of the user 215, with the image sensors of the cameras capturing image data of one or both eyes of the user 215. The one or more image sensors may also be referred to as eye capturing sensor(s). In some implementations, the one or more image sensors can capture image data that includes series of images over time, which in some examples may be sequenced together in temporal order, for instance into videos. These series of images can depict or otherwise indicate, for instance, movements of the user 215's eye(s), pupil dilations, blinking (using the eyelids), squinting (using the eyelids), saccades, fixations, eye moisture levels, optokinetic reflexes or responses, vestibulo-ocular reflexes or responses, accommodation reflexes or responses, other attributes related to eyes and/or eyelids described herein, or a combination thereof.

The sensor(s) 230 can include one or more sensors that track information about the user 215 and/or the environment, including pose (e.g., position and/or orientation), body of the user 215, and/or behaviors of the user 215. For instance, the sensor(s) 230 can include one or more cameras, image sensors, microphones, heart rate monitors, oximeters, biometric sensors, positioning receivers, Global Navigation Satellite System (GNSS) receivers, Inertial Measurement Units (IMUs), accelerometers, gyroscopes, gyrometers, barometers, thermometers, altimeters, depth sensors, light detection and ranging (LIDAR) sensors, radio detection and ranging (RADAR) sensors, sound detection and ranging (SODAR) sensors, sound navigation and ranging (SONAR) sensors, time of flight (ToF) sensors, structured light sensors, other sensors discussed herein, or combinations thereof. In some examples, the one or more sensors 230 include at least one image capture and processing system 100, image capture device 105A, image processing device 105B, or combination(s) thereof. In some examples, the one or more sensors 230 include at least one input device 1045 of the computing system 1000. In some implementations, one or more of the sensor(s) 230 may complement or refine sensor readings from other sensor(s) 230. For example, Inertial Measurement Units (IMUs), accelerometers, gyroscopes, or other sensors may be used to identify a pose (e.g., position and/or orientation) of the user device 210 and/or of the user 215 in the environment, and/or the gaze of the user 215 through the user device 210.

The sensor(s) 230 of the user device 210 capture sensor data 235. In some examples, the sensor data 235 includes information indicating a location of the user 215 in the real world and/or in an environment that is at least partially virtual. In some examples, the sensor data 235 includes information indicating a pose of the body of the user 215, for instance indicating gestures that the user 215 is performing and/or facial expressions detected on the face of the user 215. In some examples, the sensor(s) 230 include image sensor(s), and the sensor data 235 includes an image captured by the image sensor(s) of an environment (and/or of the user 215). Within FIG. 2A, a graphic representing the sensor data 235 illustrates the image as depicting an environment with two people in it. In some examples, one of the two people is the user 215. In some examples, one of the two people is the user 225. The user device 210 can send the sensor data 235 to the server(s) 205.

The server(s) 205 receive the sensor data 235. In some examples face detector 240 of the server(s) 205 detects a face of a person who is depicted in an image of the sensor data 235. The person is referred to herein as the first user, and may in some cases be the user 215. The face detector 240 can detect, extract, recognize, and/or track features of portion(s) of the first user (e.g., face, facial features, head, body), object(s), and/or portions of the environment in order to detect the face of the first user. In some examples, the face detector 240 detects the face of the first user by first detecting the body of the first user, and then detecting the face based on the expected position of the face within the structure of the body.

In some examples, the face detector 240 detects the face of the first user by inputting the sensor data 235 into one or more of the one or more trained machine learning (ML) model(s) 295 discussed herein, and receiving an output indicating the face's position and/or orientation. The trained machine learning (ML) model(s) 295 can be trained (e.g., by the user device 210, the user device 220, the server(s) 205, and/or another device) for use by the face detector 240 using training data that includes images that include faces for which positions and/or orientations of the faces are predetermined. In some examples, the face detector 240 detects a position of the face within the sensor data 235 (e.g., pixel coordinates), a position of the face within the environment (e.g., 3D coordinates within the 3D volume of the environment), an orientation (e.g., pitch, yaw, and/or roll) of the face within the sensor data 235 (e.g., along axes about which rotation is visible in the sensor data 235), and/or an orientation (e.g., pitch, yaw, and/or roll) of the face within the environment. For example, the pose (e.g., position and/or orientation) of the face in the environment can be based on how a distance between two features on the face (e.g., an inter-eye distance) in the sensor data 235 compares to a reference distance (e.g., inter-eye distance) for an average human being. In some examples, the face detector 240 detects the face of the first user using feature detection, feature extraction, feature recognition, feature tracking, object detection, object recognition, object tracking, facial detection, facial recognition, facial tracking, first user detection, first user recognition, first user tracking, classification, or a combination thereof. In some examples, some of the sensor(s) 230 face the eye(s) of the user 215, and the face detector 240 can detect the face in the sensor data 235 based on gaze detection of the gaze of the eye(s) of the user 215. In some examples, the user device 210 and/or server(s) 205 can receive one or more communications from a user device of the first user in the sensor data 235, which the face detector 240 can use as an indicator that there is likely to be a face of that first user (or a first user more generally) in the sensor data 235. Within FIG. 2A, a graphic representing the face detector 240 illustrates the sensor data 235 with a bounding box around a face of a first user depicted in the sensor data 235, with a zoomed-in version of the face of the first user illustrated extending from the box. The face appears to be a face of a young man with short hair and a beard.

The server(s) 205 include a profile identifier 245. In some examples, the profile identifier 245 receives at least some of the sensor data 235 from the user device 210. The profile identifier 245 retrieves a profile of the first user (e.g., the user 215) whose face was detected by the face detector 240 from a data store 290 and/or of the user 215 based on the received sensor data 235. In some examples, the first user is the user 215, and the profile is the profile of the user 215. If the first user does not already have a profile in the data store 290, the profile identifier 245 can create (e.g., generate) a profile for the first user. In some cases, the profile identifier 245 and/or the face detector 240 use facial recognition on the face of the first user, and/or first user recognition on the body of the first user, to recognize an identifier for the first user (e.g., name, email address, phone number, mailing address, number, code, etc.) before querying the data store 290 for the identifier to retrieve the profile for the first user from the data store 290 (or to receive an indicator from the data store 290 that no profile corresponding to the indicator exists yet).

In some examples, profile identifier 245 and/or the face detector 240 can use at least one of the trained ML model(s) 295 to perform facial recognition on the face of the first user in the sensor data 235 to determine an identifier corresponding to the first user (and/or to the first user's face) to query the data store 290 for. The trained machine learning (ML) model(s) 295 can be trained (e.g., by the user device 210, the user device 220, the server(s) 205, and/or another device) for use in facial recognition by the face detector 240 and/or the profile identifier 245 using training data that includes images that include faces for which identifiers for the faces are pre-determined. In some examples, the user device 210 and/or server(s) 205 can receive one or more communications from a user device of the first user in the sensor data 235, and the profile identifier 245 can identify an identifier corresponding to the first user (e.g., name, email address, phone number, mailing address, number, code, etc.) based on the one or more communications from the user device of the first user. In some examples, facial recognition can include comparison of the face detected in the image by the face detector 240 to a data structure of reference faces stored in the data store 290, with an identifier listed for each of the reference faces in the data store 290. Within FIG. 2A, a graphic representing the profile identifier 245 illustrates a profile with an image of the face of the first user detected by the face detector 240 (e.g., the young man with short hair and a beard), a name ("John Smith") for the same first user, an email address ("js@domain.com") for the same first user, an avatar corresponding to the same first user, and privacy settings of the same first user.

The data store 290 may include one or more data structures, such as one or more databases, tables, lists, arrays, matrices, heaps, ledgers, distributed ledgers (e.g., blockchain ledgers and/or directed acyclic graph (DAG) ledgers), or combinations thereof. The data store 290 may store profiles for first users, such as profiles for users (e.g., user 215, user 225) and/or other first users detected in image(s) (e.g., image(s) of the sensor data 235) captured by sensor(s) (e.g., sensor(s) 230) of user devices (e.g., user device 210, user device 220). A profile for a first user may include one or more images of the first user (e.g., of the first user's real face), one or more identifiers for the first user (e.g., name, email address, phone number, mailing address, number, code, etc.), one or more avatars for the first user, one or more settings and/or preferences identifying conditions for when different avatars are to be used and/or not to be used (e.g., conditions to be detected using the condition detector 255), or a combination thereof. An example of a profile for a first user "John Smith" is illustrated in the graphic representing the profile identifier 245 in FIG. 2A.

The server(s) 205 include a profile avatar identifier 250 and a condition detector 255. Once the profile identifier 245 identifies a profile for the first user whose face is detected in the sensor data 235 by the face detector 240, the profile avatar identifier 250 identifies an avatar for the first user. The avatar for the first user can be selected by the first user and/or generated using an avatar generator (e.g., which may use the trained ML model(s) 295). The profile may be associated with one or more conditions and one or more avatars. The conditions may indicate conditions under which the first user is to be represented using a first avatar of the avatars for that profile, conditions under which the first user is to be represented using a second avatar of the avatars for that profile, and so forth. The conditions may indicate conditions under which the first user is not to be represented using a first avatar of the avatars for that profile, conditions under which the first user is not to be represented using a second avatar of the avatars for that profile, and so forth. The profile avatar identifier 250 can identify which avatar the first user is to be represented by, based on which of the conditions are met and which of the conditions are not met (as determined by the condition detector 255). In some examples, the profile avatar identifier 250 can generate the avatar for the first user, for instance if the profile does not yet include any avatar, or if the profile does not include an avatar that is appropriate to represent the first user given which of the condition(s) are met and/or are not met as determined by the condition detector 255. In some examples, the profile avatar identifier 250 can generate the avatar for the first user in real-time as requested by the condition detector 255, the profile identifier 245, the data store 290, the server(s) 205, the user device 210, and/or the user device 220. In some examples, the profile avatar identifier 250 can generate the avatar for the first user ahead of time and store the avatar as part of (or in association with) the profile of the first user in the data store 290. The profile avatar identifier 250 can retrieve the avatar from the data store 290 after identifying the profile using the profile identifier 245. Within FIG. 2A, a graphic representing the profile avatar identifier 250 illustrates an arrow pointing from an image of the face of the first user detected by the face detector 240 (e.g., the young man with short hair and a beard named John Smith) to two corresponding avatars for the first user (e.g., a human-looking avatar and a dog-looking avatar).

The condition detector 255 can identify which of the conditions associated with the profile (identified by the profile identifier 245) are met and which of the conditions associated with the profile are not met. The condition detector 255 can identify whether or not conditions are met based on characteristics associated with the first user (e.g., the user 215). The characteristics associated with the first user (e.g., the user 215) may include characteristics associated with a viewer user who is to be a viewer of the representation of the first user. For instance, in some examples, condition(s) and/or characteristic(s) may be related to an identity of a viewer user who is to be a viewer of the representation of the first user. The viewer user is referred to herein as the second user. The condition(s) and/or characteristic(s) may be related to an identity of the second user, and/or a type of relationship between the first user and the second user. For instance, the first user may wish to look one way (e.g., true appearance or a realistic avatar) if the second user is a friend and/or family member of the first user (e.g., if a condition of the relationship being a friend or family relationship is met), and a different way to strangers (e.g., if the condition of the relationship being a friend or family relationship is not met). In some examples, condition(s) and/or characteristic(s) may be related to a location of the first user and/or the second user in an environment (e.g., in the real world and/or in an environment that is at least partially virtual). For instance, the first user may wish to look one way (e.g., their true appearance or a realistic avatar) while in a "home" environment (e.g., if a condition of the location being "home" is met), and a different way (e.g., a more anonymous avatar) in other environments (e.g., if the condition of the location being "home" is not met). In some examples, condition(s) and/or characteristic(s) may be related to an activity being performed by the first user and/or the second user in an environment (e.g., in the real world and/or in an environment that is at least partially virtual). For instance, the first user may wish to look one way while attending a concert or sports game or movie premier (e.g., an avatar associated with the artist or sports team or movie star or movie character) (e.g., if one of a set of conditions of the activity being a concert or sports game or movie premier is met), and a different way in other environments (e.g., a more neutral avatar) (e.g., if none of the set of conditions of the activity being a concert or sports game or movie premier are met).

In some examples, the condition detector 255 can use at least one of the trained ML model(s) 295 to determine whether a specific condition is met. For example, if the condition is based on whether or not the first user is performing a particular activity, the trained ML model(s) 295 used by the condition detector 255 can be trained (e.g., by the user device 210, the user device 220, the server(s) 205, and/or another system) to determine, based on at least the sensor data 235, whether or not the first user is performing the activity corresponding to the condition. For instance, if the activity is dancing, the condition detector 255 can input sensor data 235 (e.g., one or more images of the first user, pose data from one or more position sensors coupled to the first user), and the trained ML model(s) 295 can classify whether the representation(s) of the first user (and/or the pose of the first user) in the sensor data 235 represent a dancing activity by the first user, which the condition detector 255 can use to determine whether the dancing condition is met. In some examples, the trained machine learning model(s) can extract features and/or attributes from the sensor data 235 to identify characteristics associated with the first user. In some examples, the trained machine learning model(s) 295 can determine, based on characteristics associated with the first user, whether a condition is met. In some examples, the condition detector 255 can provide characteristics of the first user and/or the second user to the trained ML model(s) 295, and the trained ML model(s) 295 can predict whether a relationship type (and/or relationship category) between the first user and the second user (e.g., friends, family, co-workers, acquaintances, or strangers) to determine whether a condition related to relationship type (and/or relationship category) is met. In some examples, the condition detector 255 can provide image(s) (e.g., from the sensor data 235) of the first user and/or the second user to the trained ML model(s) 295, and the trained ML model(s) 295 can attempt to recognize where the first user and/or the second user are in the environment based on environment recognition of the scene depicted in the image(s). The trained machine learning (ML) model(s) 295 can be trained (e.g., by the user device 210, the user device 220, the server(s) 205, and/or another device) for use by the condition detector 255 using training data that includes various sensor data (e.g., of any of the types described herein with respect to the sensor data 235) along with pre-generated determinations as to whether certain types of conditions are met (e.g., regarding identity of the second user, relationship type (and/or relationship category) between the first user and the second user, location of the first user, location of the second user, activity of the first user, activity of the second user, and/or other types of conditions described herein) corresponding to the sensor data. Within FIG. 2A, a graphic representing the condition detector 255 illustrates examples of types of conditions that the condition detector 255 can be configured to detect, such as conditions associated with whether user(s) are in a location (represented by an icon depicting map marker on a map), conditions associated with an identity of the second user is who is viewing the first user (represented by an icon depicting an eye), conditions associated with a relationship type (and/or relationship category) between the first user and the second user is who is viewing the first user (represented by an icon depicting group of persons with ID tags), conditions associated with activities being performed by the first user or the second user (represented by an icon depicting a bicycle).

The server(s) 205 include an avatar processor 260. In some examples, the profile avatar identifier 250, the condition detector 255, and/or the avatar processor 260 select a display avatar from the set of display avatars associated with the profile (identified by the profile identifier 245) based on which of the profile's conditions are met and/or are not met. The avatar processor 260 can generate display avatar data 265, which can include a representation of the display avatar that is to be displayed to the second user (e.g., to the user 225 through the user device 220 and/or to the user 215 through the user device 210). In some examples, the avatar processor 260 can generate the representation of the display avatar in the display avatar data 265 by modifying an image from the sensor data 235 to use the selected display avatar (e.g., identified based on the condition(s)) for the first user in place of at least a portion of the first user in the image. In some examples, the avatar includes at least a face, a head, and/or a body. In some examples, to generate the display avatar data 265, the avatar processor 260 superimposes the avatar for the first user over at least a portion of the first user (e.g., at least a portion of the face and/or head and/or body) as depicted or otherwise represented in the sensor data 235. In some examples, the avatar processor 260 generates the display avatar data 265 by configuring the display avatar according to characteristics of the first user (e.g., a pose of the first user), so that the display avatar matches the characteristics of the first user (e.g., the pose of the first user) in the display avatar data 265. In some examples, the avatar processor 260 generates the display avatar data 265 by determining lighting and/or illumination effects (e.g., lighting and/or illumination direction, lighting and/or illumination strength, lighting and/or illumination color, lighting and/or illumination type) on the first user, and applying the lighting and/or illumination effects to the display avatar.

In some examples, the avatar processor 260 uses at least one of the trained machine learning model(s) 295 to generate the display avatar data 265. The trained machine learning model(s) 295 can help to ensure that the avatar looks realistic on, and blends into, the rest of the body of the first user and/or the environment as depicted or otherwise represented in the display avatar data 265 and/or the sensor data 235. The trained machine learning (ML) model(s) 295 can be trained (e.g., by the user device 210, the user device 220, the server(s) 205, and/or another device) for use by the avatar processor 260 using training data that includes sensor data (e.g., such as sensor data 235), a selected display avatar, and pre-generated display avatar data (e.g., such as display avatar data 265) corresponding to the sensor data and the selected display avatar.

In some examples, the avatar processor 260 blends the avatar realistically into the rest of the first user's body and/or into environment in the sensor data 235, for instance to account for lighting in the environment, head pose (e.g. position and/or orientation) of the first user's head, facial expression that the first user is making in the sensor data 235, body pose of the first user's body, skin tone (e.g., skin color) of the first user, or a combination thereof. For instance, in some examples, the avatar processor 260 can determine environmental illumination on the first user in their real or virtual environment (e.g., based on the sensor data 235), and can replicate the same environmental illumination on the avatar. The environmental illumination can include color of lighting, strength of lighting, direction of lighting (e.g., from the left, from the right, from above, and/or from below), any shadows cast onto the face from other object(s) in the environment, or combinations thereof. This can ensure that immersion is not broken. In some examples, the avatar processor 260 can determine a facial expression (e.g., smiling, laughing, frowning, crying, surprised, etc.) of the face of the first user detected in the sensor data 235 using the face detector 240, and can modify the avatar to apply the same facial expression (e.g., as in the combined face 730 of FIG. 7). In some examples, the avatar processor 260 can determine a facial expression (e.g., smiling, laughing, frowning, crying, surprised, etc.) of the face of the first user detected in the sensor data 235 using the face detector 240, and can modify or process the avatar to apply the same facial expression, for instance as in the combined face 730 of FIG. 7. This can allow the second user (e.g., the user 225) who views the display avatar data 265 representing the first user (e.g., the user 215) to see, in the display avatar data 265, a representation of the first user's mouth moving when the first user talks, and/or to see other facial expressions on the first user's face, realistically without breaking immersion, all while still maintaining the first user's privacy and not revealing the identity to the first user (unless the first user chooses to use a realistic avatar under the current condition(s)). Within FIG. 2A, a graphic representing the avatar processor 260 illustrates the environment depicted in an image of the sensor data 235 and the display avatar data 265 with a bounding box around the face of the first user (as in the graphic representing the face detector 240), with a zoomed-in version of the selected display avatar (e.g., with a dog-like head) for the first user illustrated extending from the box.

In some examples, the server(s) 205 can generate the avatar for the first user (e.g., using the condition detector 255), and/or can modify the avatar for the first user (e.g., using the condition detector 255 and/or the avatar processor 260) so that the skin tone of the avatar corresponds to the skin tone (e.g., skin color) of the first user. Thus, if the display avatar only replaces a portion of the first user (e.g., the face or head of the first user), or if the avatar processor 260 keeps part of the original representation of the first user (erroneously or intentionally) in the display avatar data 265, the skin tone of the avatar does not clash with the skin tone of other parts of the user's body that may be visible in the display avatar data 265 (e.g., hands, arms, legs, neck, feet, etc.). This can ensure that immersion is not broken. In some examples, the condition detector 255 and/or the avatar processor 260 can alter the skin tone of other parts of the user's body that are visible in the sensor data 235 and/or display avatar data 265 (e.g., hands, arms, legs, neck, feet, etc.) to match the skin tone of the selected display avatar. This can increase privacy further, for instance so that the second user does not even know the original skin tone of the first user—only that of the selected display avatar.

The avatar processor 260 outputs the display avatar data 265, for instance by sending the display avatar data 265 to the user device 210 to be output to the user 215 by output device(s) 270A of the user device 210 and/or by sending the display avatar data 265 to the user device 220 to be output to the user 225 by output device(s) 270B of the user device 220. Within FIG. 2A, a graphic representing the display avatar data 265 illustrates the display avatar data 265 as depicting the same environment with two people in it as in the graphic representing the sensor data 235, but with the face of one of the people changed to that of the selected display avatar (e.g., with the dog-like head illustrated with respect to the profile avatar identifier 250 and the avatar processor 260).

The user device 210 includes output device(s) 270A. The user device 220 includes output device(s) 270B. The output device(s) 270A-270B can include one or more visual output devices, such as display(s) or connector(s) therefor. The output device(s) 270A-270B can include one or more audio output devices, such as speaker(s), headphone(s), and/or connector(s) therefor. The output device(s) 270A-270B can include one or more of the output device 1035 and/or of the communication interface 1040 of the computing system 1000. The user device 220 causes the display(s) of the output device 270A-270B to display the display avatar data 265.

In some examples, the output device(s) 270A-270B include one or more transceivers. The transceiver(s) can include wired transmitters, receivers, transceivers, or combinations thereof. The transceiver(s) can include wireless transmitters, receivers, transceivers, or combinations thereof. The transceiver(s) can include one or more of the output device 1035 and/or of the communication interface 1040 of the computing system 1000. In some examples, the user device 210 and/or user device 220 causes the transceiver(s) to send, to a recipient device, the display avatar data 265. The recipient device can include a display, and the data sent to the recipient device from the transceiver(s) of the output device(s) 270A-270B can cause the display of the recipient device to display the display avatar data 265.

In some examples, the display(s) of the output device(s) 270A-270B of the imaging system 200A function as optical "see-through" display(s) that allow light from the real-world environment (scene) around the imaging system 200A to traverse (e.g., pass) through the display(s) of the output device(s) 270A-270B to reach one or both eyes of the user. For example, the display(s) of the output device(s) 270A-270B can be at least partially transparent, translucent, light-permissive, light-transmissive, or a combination thereof. In an illustrative example, the display(s) of the output device(s) 270A-270B includes a transparent, translucent, and/or light-transmissive lens and a projector. The display(s) of the output device(s) 270A-270B of can include a projector that projects virtual content (e.g., the display avatar(s) of the display avatar data 265) onto the lens. The lens may be, for example, a lens of a pair of glasses, a lens of a goggle, a contact lens, a lens of a head-mounted display (HMD) device, or a combination thereof. Light from the real-world environment passes through the lens and reaches one or both eyes of the user. The projector can project virtual content (e.g., the display avatar(s) of the display avatar data 265) onto the lens, causing the virtual content to appear to be overlaid over the user's view of the environment from the perspective of one or both of the user's eyes. In some examples, the projector can project the virtual content onto the onto one or both retinas of one or both eyes of the user rather than onto a lens, which may be referred to as a virtual retinal display (VRD), a retinal scan display (RSD), or a retinal projector (RP) display.

In some examples, the display(s) of the output device(s) 270A-270B of the imaging system 200A are digital "pass-through" display that allow the user of a user device (e.g., user 215 of user device 210 or user 225 of user device 220) of the imaging system 200A to see a view of an environment by displaying the view of the environment on the display(s) of the output device(s) 270A-270B. The view of the environment that is displayed on the digital pass-through display can be a view of the real-world environment around the imaging system 200A, for example based on sensor data (e.g., images, videos, depth images, point clouds, other depth data, or combinations thereof) captured by one or more environment-facing sensors of the sensor(s) 230, in some cases as modified using the avatar processor 260 (e.g., the display avatar data 265). The view of the environment that is displayed on the digital pass-through display can be a virtual environment (e.g., as in VR), which may in some cases include elements that are based on the real-world environment (e.g., boundaries of a room). The view of the environment that is displayed on the digital pass-through display can be an augmented environment (e.g., as in AR) that is based on the real-world environment. The view of the environment that is displayed on the digital pass-through display can be a mixed environment (e.g., as in MR) that is based on the real-world environment. The view of the environment that is displayed on the digital pass-through display can include virtual content (e.g., display avatar(s) of the display avatar data 265) overlaid over other otherwise incorporated into the view of the environment.

The trained ML model(s) 295 can include one or more neural network (NNs) (e.g., neural network 800), one or more convolutional neural networks (CNNs), one or more trained time delay neural networks (TDNNs), one or more deep networks, one or more autoencoders, one or more deep belief nets (DBNs), one or more recurrent neural networks (RNNs), one or more generative adversarial networks (GANs), one or more conditional generative adversarial networks (cGANs), one or more other types of neural networks, one or more trained support vector machines (SVMs), one or more trained random forests (RFs), one or more computer vision systems, one or more deep learning systems, or combinations thereof.

Within FIG. 2A, a graphic representing the trained ML model(s) 295 illustrates a set of circles connected to another. Each of the circles can represent a node (e.g., node 816), a neuron, a perceptron, a layer, a portion thereof, or a combination thereof. The circles are arranged in columns. The leftmost column of white circles represent an input layer (e.g., input layer 810). The rightmost column of white circles represent an output layer (e.g., output layer 814). Two columns of shaded circled between the leftmost column of white circles and the rightmost column of white circles each represent hidden layers (e.g., hidden layers 812A-812N).

In some examples, the imaging system 200A includes feedback engine(s) 275A-275B of the user devices (e.g., user device 210 and/or user device 220). The feedback engine(s) 275A-275B are illustrated as part of the user device 210 and user device 220, respectively, but may additionally or alternatively be part of the server(s) 205. The feedback engine(s) 275A-275B can detect feedback received from a user interface of the user device 210, the user device 220, and/or the server(s) 205. The feedback may include feedback on the display avatar data 265 as displayed (e.g., using the display(s) of the output device(s) 270A-270B) according to interactivity client applications 280A-280B and/or interactivity server application 285. The feedback may include feedback on the display avatar data 265 on its own. The feedback may include feedback on the avatar(s) generated and/or selected and/or processed by the profile avatar identifier 250 and/or condition detector 255 and/or avatar processor 260 and incorporated into the display avatar data 265, and/or the processing of the selected display avatar(s) (e.g., blending with the rest of an image) in the display avatar data 265 by the avatar processor 260. The feedback may include feedback on face detection by the face detector 240 and/or the face recognition by the face detector 240 and/or the profile identifier 245. The feedback may include feedback about the face detector 240, the profile identifier 245, the profile avatar identifier 250, the condition detector 255, the avatar processor 260, or a combination thereof.

The feedback engine(s) 275A-275B can detect feedback about one engine of the imaging system 200A received from another engine of the imaging system 200A, for instance whether one engine decides to use data from the other engine or not. The feedback received by the feedback engine(s) 275A-275B can be positive feedback or negative feedback. For instance, if the one engine of the imaging system 200A uses data from another engine of the imaging system 200A, or if positive feedback from a user is received through a user interface, the feedback engine(s) 275A-275B can interpret this as positive feedback. If the one engine of the imaging system 200A declines to data from another engine of the imaging system 200A, or if negative feedback from a user is received through a user interface, the feedback engine(s) 275A-275B can interpret this as negative feedback. Positive feedback can also be based on attributes of the sensor data from the sensor(s) 230, such as the user smiling, laughing, nodding, saying a positive statement (e.g., "yes," "confirmed," "okay," "next"), or otherwise positively reacting to an output of one of the engines described herein, or an indication thereof. Negative feedback can also be based on attributes of the sensor data from the sensor(s) 230, such as the user frowning, crying, shaking their head (e.g., in a "no" motion), saying a negative statement (e.g., "no," "negative," "bad," "not this"), or otherwise negatively reacting to an output of one of the engines described herein, or an indication thereof.

In some examples, the feedback engine(s) 275A-275B provides the feedback to one or more ML systems (e.g., to the server(s) 205) of the imaging system 200A as training data to update the one or more trained ML model(s) 295 of the imaging system 200A. For instance, the feedback engine(s) 275A-275B can provide the feedback as training data to the ML system(s) and/or the trained ML model(s) 295 to update the training for the face detector 240, the profile identifier 245, the profile avatar identifier 250, the condition detector 255, the avatar processor 260, or a combination thereof. Positive feedback can be used to strengthen and/or reinforce weights associated with the outputs of the ML system(s) and/or the trained ML model(s) 295, and/or to weaken or remove other weights other than those associated with the outputs of the ML system(s) and/or the trained ML model(s) 295. Negative feedback can be used to weaken and/or remove weights associated with the outputs of the ML system(s) and/or the trained ML model(s) 295, and/or to strengthen and/or reinforce other weights other than those associated with the outputs of the ML system(s) and/or the trained ML model(s) 295.

In some examples, certain elements of the imaging system 200A (e.g., the face detector 240, the profile identifier 245, the profile avatar identifier 250, the condition detector 255, the avatar processor 260, the feedback engine(s) 275A-275B, the trained ML model(s) 295, the interactivity client applications 280A-280B, the interactivity serve application 285, the data store 290, or a combination thereof) include a software element, such as a set of instructions corresponding to a program, that is run on a processor such as the processor 1010 of the computing system 1000, the image processor 150, the host processor 152, the ISP 154, or a combination thereof. In some examples, these elements of the imaging system 200A include one or more hardware elements, such as a specialized processor (e.g., the processor 1010 of the computing system 1000, the image processor 150, the host processor 152, the ISP 154, or a combination thereof). In some examples, these elements of the imaging system 200A can include a combination of one or more software elements and one or more hardware elements.

In some examples, certain elements of the imaging system 200A (e.g., the face detector 240, the profile identifier 245, the profile avatar identifier 250, the condition detector 255, the avatar processor 260, the feedback engine(s) 275A-275B, the trained ML model(s) 295, the interactivity client applications 280A-280B, the interactivity serve application 285, the data store 290, or a combination thereof), other instances thereof, or portions thereof, are included as part of, and/or run on, different devices than those illustrated in FIG. 2A. For instance, the user device 220 can include its own instance of the sensor(s) 230, even though these are not illustrated in FIG. 2A. Further, examples of elements of the server(s) 205 running on the user device 210 are illustrated in FIG. 2B.

Figure 2B:
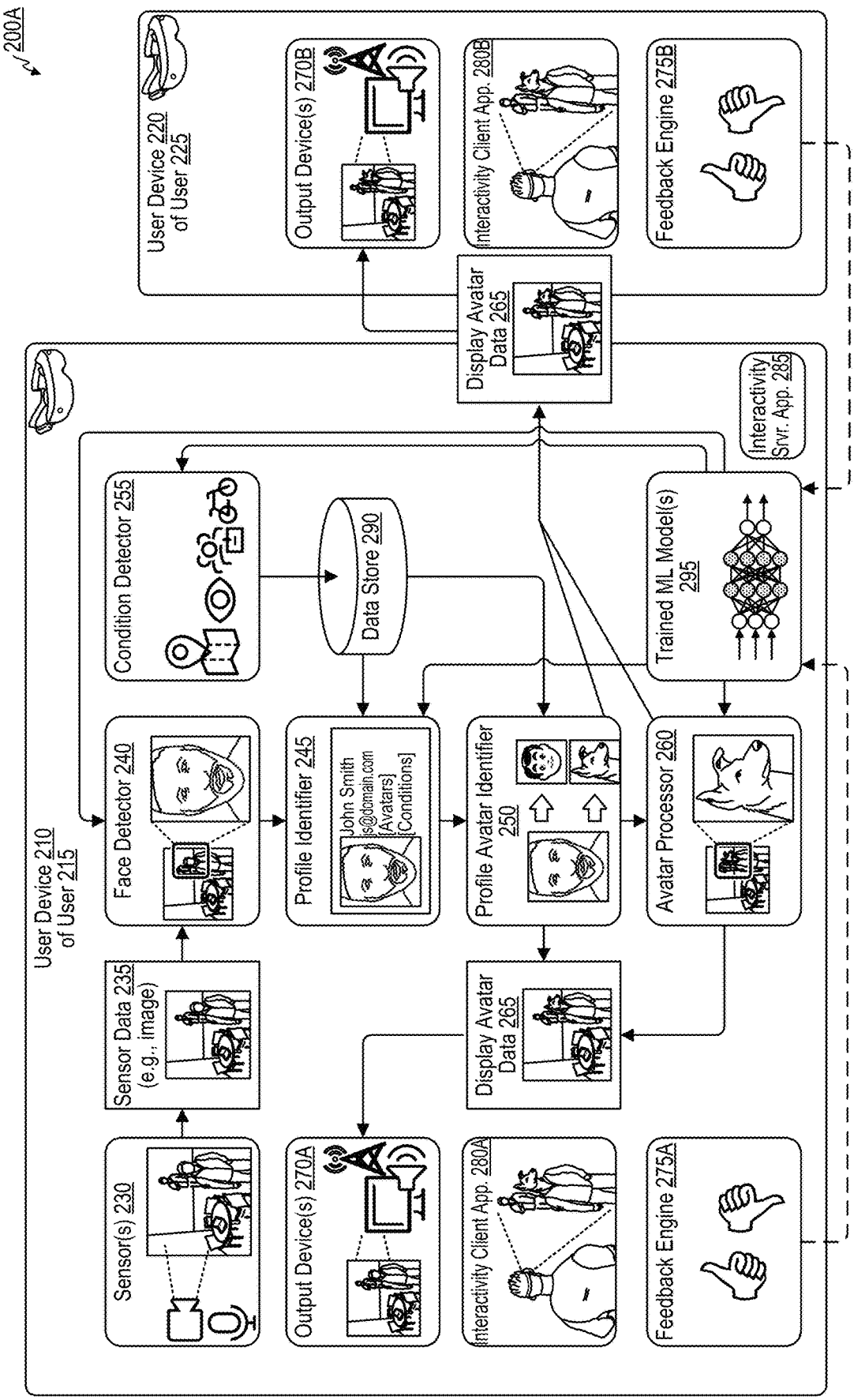
FIG. 2B is a block diagram illustrating an example architecture of imaging process performed by an imaging system with two user devices, in accordance with some examples.

FIG. 2B is a block diagram illustrating an example architecture of imaging process performed by an imaging system 200B with two user devices (e.g., user device 210, user device 220). The imaging system 200B of FIG. 2B is similar to the imaging system 200A of FIG. 2A, but lacks the server(s) 205. Instead, all of the components that are part of the server(s) 205 in the imaging system 200A of FIG. 2A are part of the user device 210 in the imaging system 200B of FIG. 2B. All of the processes and/or operations that are performed by the server(s) 205 in the imaging system 200A of FIG. 2A are performed by the user device 210 in the imaging system 200B of FIG. 2B. In some examples, an imaging system between the imaging system 200A of FIG. 2A and the imaging system 200B of FIG. 2B can be used, where certain components and/or operations are maintained at server(s) 205, while other components and/or operations are maintained at the user device 210.

Figure 3A:
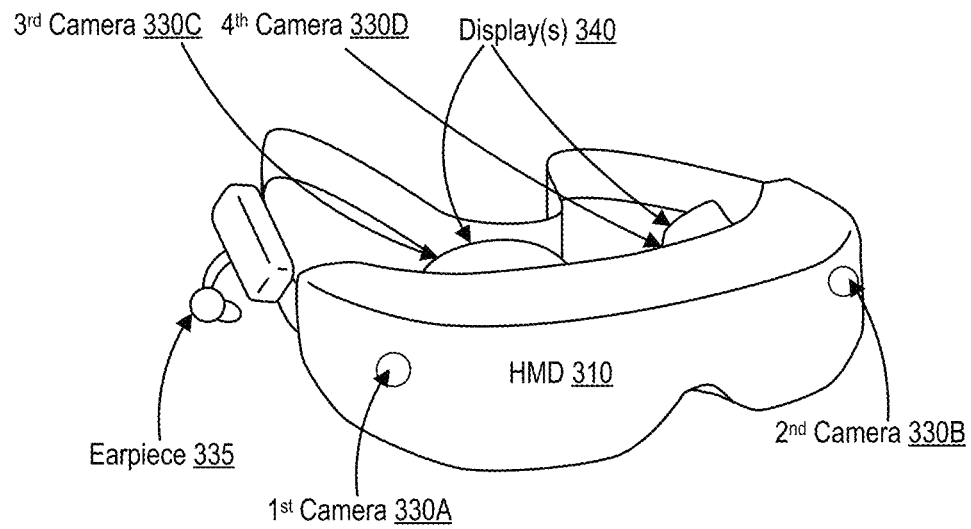
FIG. 3A is a perspective diagram illustrating a head-mounted display (HMD) that is used as part of an imaging system, in accordance with some examples.

FIG. 3A is a perspective diagram 300 illustrating a head-mounted display (HMD) 310 that is used as part of an imaging system 200. The HMD 310 may be, for example, an augmented reality (AR) headset, a virtual reality (VR) headset, a mixed reality (MR) headset, an extended reality (XR) headset, or some combination thereof. The HMD 310 may be an example of a user device (e.g., user device 210 and/or user device 220) of an imaging system (e.g., imaging system 200A and/or an imaging system 200B). The HMD 310 includes a first camera 330A and a second camera 330B along a front portion of the HMD 310. The first camera 330A and the second camera 330B may be examples of the sensor(s) 230 of the imaging systems 200A-200B. The HMD 310 includes a third camera 330C and a fourth camera 330D facing the eye(s) of the user as the eye(s) of the user face the display(s) 340. The third camera 330C and the fourth camera 330D may be examples of the sensor(s) 230 of the imaging systems 200A-200B. In some examples, the HMD 310 may only have a single camera with a single image sensor. In some examples, the HMD 310 may include one or more additional cameras in addition to the first camera 330A, the second camera 330B, third camera 330C, and the fourth camera 330D. In some examples, the HMD 310 may include one or more additional sensors in addition to the first camera 330A, the second camera 330B, third camera 330C, and the fourth camera 330D, which may also include other types of sensor(s) 230 of the imaging system 200. In some examples, the first camera 330A, the second camera 330B, third camera 330C, and/or the fourth camera 330D may be examples of the image capture and processing system 100, the image capture device 105A, the image processing device 105B, or a combination thereof.

The HMD 310 may include one or more displays 340 that are visible to a user 320 wearing the HMD 310 on the user 320's head. The one or more displays 340 of the HMD 310 can be examples of the one or more displays of the output device(s) 270A-270B of the imaging systems 200A-200B. In some examples, the HMD 310 may include one display 340 and two viewfinders. The two viewfinders can include a left viewfinder for the user 320's left eye and a right viewfinder for the user 320's right eye. The left viewfinder can be oriented so that the left eye of the user 320 sees a left side of the display. The right viewfinder can be oriented so that the right eye of the user 320 sees a right side of the display. In some examples, the HMD 310 may include two displays 340, including a left display that displays content to the user 320's left eye and a right display that displays content to a user 320's right eye. The one or more displays 340 of the HMD 310 can be digital "pass-through" displays or optical "see-through" displays.

Figure 3B:
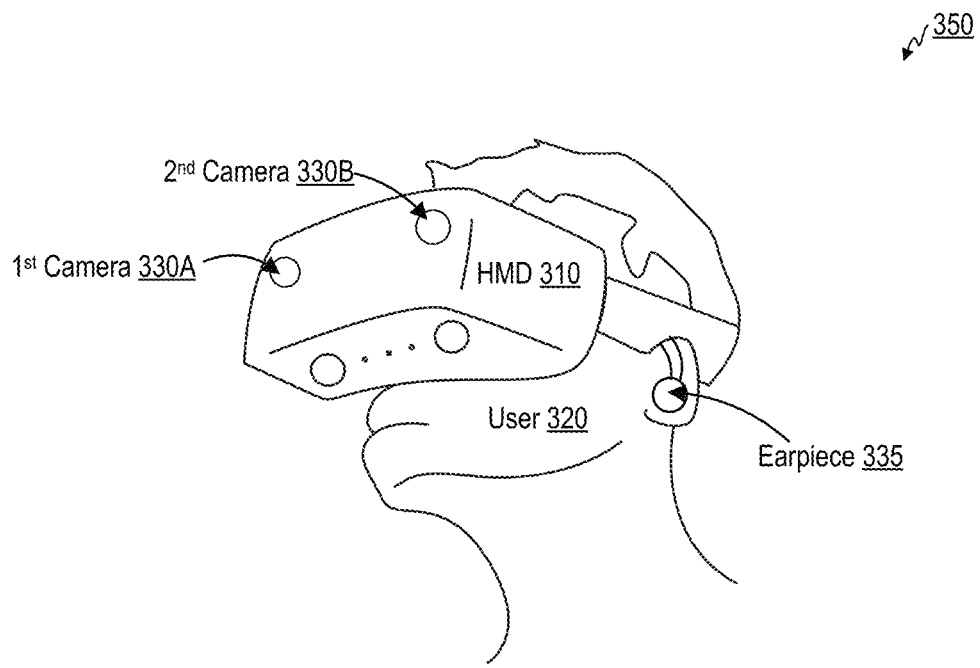
FIG. 3B is a perspective diagram illustrating the head-mounted display (HMD) of FIG. 3A being worn by a user, in accordance with some examples.

The HMD 310 may include one or more earpieces 335, which may function as speakers and/or headphones that output audio to one or more ears of a user of the HMD 310, and may be examples of output device(s) 270A-270B. One earpiece 335 is illustrated in FIGS. 3A and 3B, but it should be understood that the HMD 310 can include two earpieces, with one earpiece for each ear (left ear and right ear) of the user. In some examples, the HMD 310 can also include one or more microphones (not pictured). The one or more microphones can be examples of the sensor(s) 230 of the imaging systems 200A-200B. In some examples, the audio output by the HMD 310 to the user through the one or more earpieces 335 may include, or be based on, audio recorded using the one or more microphones.

FIG. 3B is a perspective diagram 350 illustrating the head-mounted display (HMD) of FIG. 3A being worn by a user 320. The user 320 wears the HMD 310 on the user 320's head over the user 320's eyes. The HMD 310 can capture images with the first camera 330A and the second camera 330B. In some examples, the HMD 310 displays one or more output images toward the user 320's eyes using the display(s) 340. In some examples, the output images can include the display avatar data 265. The output images can be based on the images captured by the first camera 330A and the second camera 330B (e.g., the sensor data 235), for example with the virtual content (e.g., display avatar(s) of the display avatar data 265) overlaid. The output images may provide a stereoscopic view of the environment, in some cases with the virtual content overlaid and/or with other modifications. For example, the HMD 310 can display a first display image to the user 320's right eye, the first display image based on an image captured by the first camera 330A. The HMD 310 can display a second display image to the user 320's left eye, the second display image based on an image captured by the second camera 330B. For instance, the HMD 310 may provide overlaid virtual content in the display images overlaid over the images captured by the first camera 330A and the second camera 330B. The third camera 330C and the fourth camera 330D can capture images of the eyes of the before, during, and/or after the user views the display images displayed by the display(s) 340. This way, the sensor data from the third camera 330C and/or the fourth camera 330D can capture reactions to the virtual content by the user's eyes (and/or other portions of the user). An earpiece 335 of the HMD 310 is illustrated in an ear of the user 320. The HMD 310 may be outputting audio to the user 320 through the earpiece 335 and/or through another earpiece (not pictured) of the HMD 310 that is in the other ear (not pictured) of the user 320.

Figure 4A:
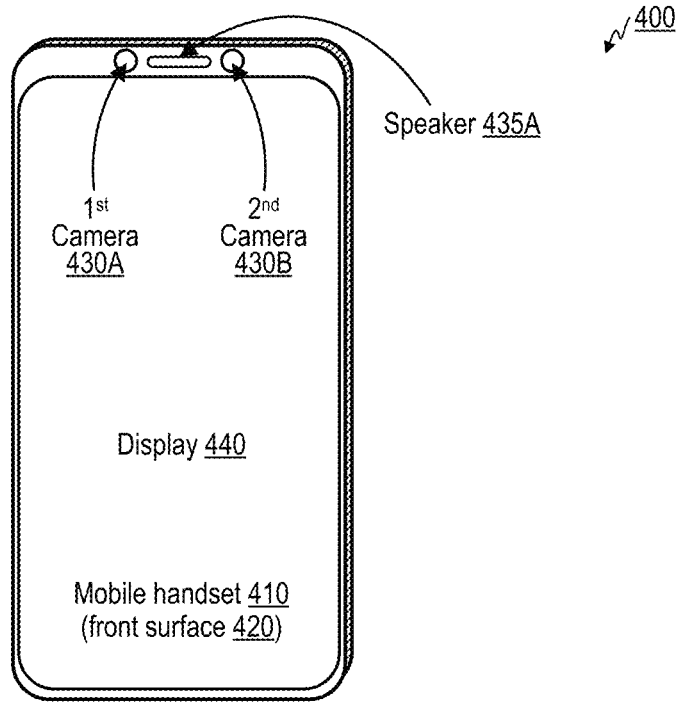
FIG. 4A is a perspective diagram illustrating a front surface of a mobile handset that includes front-facing cameras and that can be used as part of an imaging system, in accordance with some examples.

FIG. 4A is a perspective diagram 400 illustrating a front surface of a mobile handset 410 that includes front-facing cameras and can be used as part of an imaging system 200. The mobile handset 410 may be an example of user device (e.g., user device 210 and/or user device 220) of an imaging system (e.g., imaging system 200A and/or imaging system 200B). The mobile handset 410 may be, for example, a cellular telephone, a satellite phone, a portable gaming console, a music player, a health tracking device, a wearable device, a wireless communication device, a laptop, a mobile device, any other type of computing device or computing system discussed herein, or a combination thereof.

The front surface 420 of the mobile handset 410 includes a display 440. The front surface 420 of the mobile handset 410 includes a first camera 430A and a second camera 430B.

The first camera 430A and the second camera 430B may be examples of the sensor(s) 230 of the imaging systems 200A-200B. The first camera 430A and the second camera 430B can face the user, including the eye(s) of the user, while content (e.g., the display avatar data 265 output by the avatar processor 260) is displayed on the display 440. The display 440 may be an example of the display(s) of the output device(s) 270A-270B of the imaging systems 200A-200B.

The first camera 430A and the second camera 430B are illustrated in a bezel around the display 440 on the front surface 420 of the mobile handset 410. In some examples, the first camera 430A and the second camera 430B can be positioned in a notch or cutout that is cut out from the display 440 on the front surface 420 of the mobile handset 410. In some examples, the first camera 430A and the second camera 430B can be under-display cameras that are positioned between the display 440 and the rest of the mobile handset 410, so that light passes through a portion of the display 440 before reaching the first camera 430A and the second camera 430B. The first camera 430A and the second camera 430B of the perspective diagram 400 are front-facing cameras. The first camera 430A and the second camera 430B face a direction perpendicular to a planar surface of the front surface 420 of the mobile handset 410. The first camera 430A and the second camera 430B may be two of the one or more cameras of the mobile handset 410. In some examples, the front surface 420 of the mobile handset 410 may only have a single camera.

In some examples, the display 440 of the mobile handset 410 displays one or more output images toward the user using the mobile handset 410. In some examples, the output images can include the display avatar data 265. The output images can be based on the images (e.g., sensor data 235) captured by the first camera 430A, the second camera 430B, the third camera 430C, and/or the fourth camera 430D, for example with the virtual content (e.g., display avatar(s) of the display avatar data 265) overlaid.

In some examples, the front surface 420 of the mobile handset 410 may include one or more additional cameras in addition to the first camera 430A and the second camera 430B. The one or more additional cameras may also be examples of the sensor(s) 230 of the imaging systems 200A-200B. In some examples, the front surface 420 of the mobile handset 410 may include one or more additional sensors in addition to the first camera 430A and the second camera 430B. The one or more additional sensors may also be examples of the sensor(s) 230 of the imaging systems 200A-200B. In some cases, the front surface 420 of the mobile handset 410 includes more than one display 440. The one or more displays 440 of the front surface 420 of the mobile handset 410 can be examples of the display(s) of the output device(s) 270A-270B of the imaging systems 200A-200B. For example, the one or more displays 440 can include one or more touchscreen displays.

The mobile handset 410 may include one or more speakers 435A and/or other audio output devices (e.g., earphones or headphones or connectors thereto), which can output audio to one or more ears of a user of the mobile handset 410. One speaker 435A is illustrated in FIG. 4A, but it should be understood that the mobile handset 410 can include more than one speaker and/or other audio device. In some examples, the mobile handset 410 can also include one or more microphones (not pictured). The one or more microphones can be examples of the sensor(s) 230 of the imaging systems 200A-200B. In some examples, the mobile handset 410 can include one or more microphones along and/or adjacent to the front surface 420 of the mobile handset 410, with these microphones being examples of the sensor(s) 230 of the imaging systems 200A-200B. In some examples, the audio output by the mobile handset 410 to the user through the one or more speakers 435A and/or other audio output devices may include, or be based on, audio recorded using the one or more microphones.

Figure 4B:
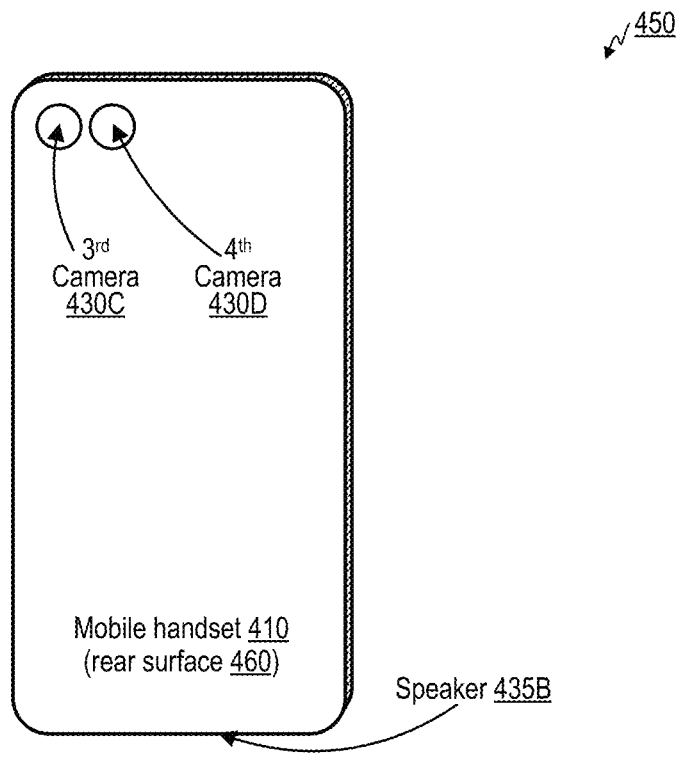
FIG. 4B is a perspective diagram illustrating a rear surface of a mobile handset that includes rear-facing cameras and that can be used as part of an imaging system, in accordance with some examples.

FIG. 4B is a perspective diagram 450 illustrating a rear surface 460 of a mobile handset that includes rear-facing cameras and that can be used as part of an imaging system 200. The mobile handset 410 includes a third camera 430C and a fourth camera 430D on the rear surface 460 of the mobile handset 410. The third camera 430C and the fourth camera 430D of the perspective diagram 450 are rear-facing. The third camera 430C and the fourth camera 430D may be examples of the sensor(s) 230 of the imaging systems 200A-200B of FIGS. 2A-2B. The third camera 430C and the fourth camera 430D face a direction perpendicular to a planar surface of the rear surface 460 of the mobile handset 410.

The third camera 430C and the fourth camera 430D may be two of the one or more cameras of the mobile handset 410. In some examples, the rear surface 460 of the mobile handset 410 may only have a single camera. In some examples, the rear surface 460 of the mobile handset 410 may include one or more additional cameras in addition to the third camera 430C and the fourth camera 430D. The one or more additional cameras may also be examples of the sensor(s) 230 of the imaging systems 200A-200B. In some examples, the rear surface 460 of the mobile handset 410 may include one or more additional sensors in addition to the third camera 430C and the fourth camera 430D. The one or more additional sensors may also be examples of the sensor(s) 230 of the imaging systems 200A-200B. In some examples, the first camera 430A, the second camera 430B, third camera 430C, and/or the fourth camera 430D may be examples of the image capture and processing system 100, the image capture device 105A, the image processing device 105B, or a combination thereof.

The mobile handset 410 may include one or more speakers 435B and/or other audio output devices (e.g., earphones or headphones or connectors thereto), which can output audio to one or more ears of a user of the mobile handset 410. One speaker 435B is illustrated in FIG. 4B, but it should be understood that the mobile handset 410 can include more than one speaker and/or other audio device. In some examples, the mobile handset 410 can also include one or more microphones (not pictured). The one or more microphones can be examples of the sensor(s) 230 of the imaging systems 200A-200B. In some examples, the mobile handset 410 can include one or more microphones along and/or adjacent to the rear surface 460 of the mobile handset 410, with these microphones being examples of the sensor(s) 230 of the imaging systems 200A-200B. In some examples, the audio output by the mobile handset 410 to the user through the one or more speakers 435B and/or other audio output devices may include, or be based on, audio recorded using the one or more microphones.

The mobile handset 410 may use the display 440 on the front surface 420 as a pass-through display. For instance, the display 440 may display output images, such as the display avatar data 265. The output images can be based on the images (e.g. sensor data 235) captured by the third camera 430C and/or the fourth camera 430D, for example with the virtual content (e.g., display avatar(s) of the display avatar data 265) overlaid and/or with modifications by the avatar processor 260 applied. The first camera 430A and/or the second camera 430B can capture images of the user's eyes (and/or other portions of the user) before, during, and/or after the display of the output images with the virtual content on the display 440. This way, the sensor data from the first camera 430A and/or the second camera 430B can capture reactions to the virtual content by the user's eyes (and/or other portions of the user).

Figure 5A:
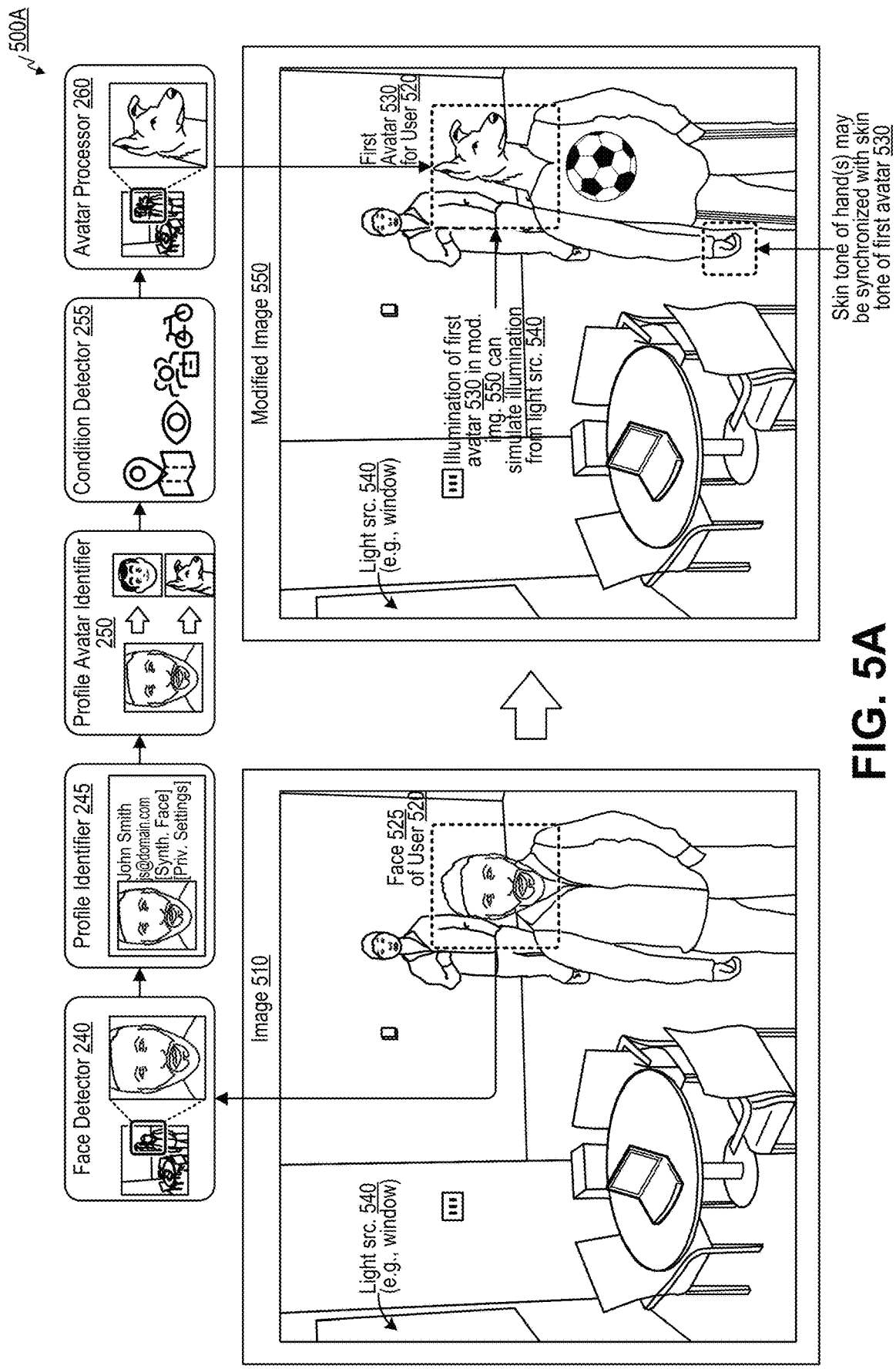
FIG. 5A is a conceptual diagram illustrating generation of a modified image from an image by using a first avatar for a user in place of the representation of the user in the image, in accordance with some examples.

FIG. 5A is a conceptual diagram 500A illustrating generation of a modified image 550 from an image 510 by using a first avatar 530 for a user 520 in place of the representation of the user 520 in the image. For instance, an image 510 is illustrated, which may be an example of sensor data 235 captured by the sensor(s) 230. The face detector 240 detects the face 525 of the user 520 in the image 510. The profile identifier 245 identifies that the face 525 of the user 520 in the image 510 belongs to a user 520 by the name of John Smith, and retrieves the profile for that user 520 (e.g., from the data store 290) or creates the profile (e.g., to store in the data store 290) if the profile does not already exist. The profile avatar identifier 250 identifies, based on the profile for the user 520, avatars that can be used for the user 520 under different conditions. The condition detector 255 identifies which of the condition(s) associated with the profile (identified by the profile identifier 245) are met and which of the condition(s) associated with the profile (identified by the profile identifier 245) are not met. The profile avatar identifier 250 and/or the condition detector 255 select a first avatar 530 to represent the user 520 in the modified image 550. The first avatar 530 may be referred to as a display avatar. The avatar processor 260 generates the modified image 550 by modifying the image 510 to use the first avatar 530 to represent the user 520 in place of the representation of the user 520 in the image 510. The first avatar 530 is represented as having a dog-like head. Because the display avatar 530 does not look like the user 520's actual appearance, the display avatar 530 can therefore can be used to protect the privacy of the user 520 within an environment that is at least partially virtual, as in an environment corresponding to a network-based interactive system. The first avatar 530 appears different from the user 520 both in head and portions of the body, for instance with the torso the display avatar 530 wearing a different outfit (a shirt with a soccer ball logo and pants with vertical stripes down the sides) than the user 520 is actually wearing in the image 510 (a jacket and pants without stripes).

The image 510 depicts light coming from a light source 540, namely a window. In some examples, light sources may include windows, lamps, the sun, display screens, light bulbs, or combinations thereof. The face 525 (and/or body) of the user 520 is illuminated from the left by the light source 540 in the image 510. Thus, to generate the modified image 550, the avatar processor 260 modifies the image 510 to use the first avatar 530 for the user 520 in place of at least a portion of the user 520, and applies and/or simulates lighting from light source 540 to the first avatar 530 in the modified image 550. The avatar processor 260 can applies and/or simulates lighting from light source 540 to the first avatar 530 by applying and/or simulating lighting from the same direction as the light source 540 (e.g., from the left of the first avatar 530, similar to the light being from the left of the user 520), of a similar light color as the light from the light source 540 as illustrated in the image 510, using a similar light pattern as the light from the light source 540 as illustrated in the image 510, or a combination thereof.

The image 510 and the modified image 550 both depict exposed hands of the user 520 and/or first avatar 530 in addition to the exposed face (e.g., face 525 or face of first avatar 530) of the user 520. The condition detector 255 and/or avatar processor 260 can synchronize a skin tone (e.g., skin color) between the face 525, the avatar 530, and/or other portions of the user 520's body that are visible in the image 510 and/or the modified image 550 (e.g., as in the hands of the user 520). For instance, in some examples, the imaging system can generate the avatar 530, or modify the avatar 530 after the avatar 530 is generated, so that the skin tone of the avatar corresponds to (e.g., matches) the skin tone of the face 525 and/or other portions of the user 520's body that are visible in the image 510 (e.g., as in the hands of the user 520). In some examples, the imaging system can alter the skin tone of other parts of the user's body that are visible in the image (e.g., the hands of the user 520) to match the skin tone of the avatar.

Figure 5B:
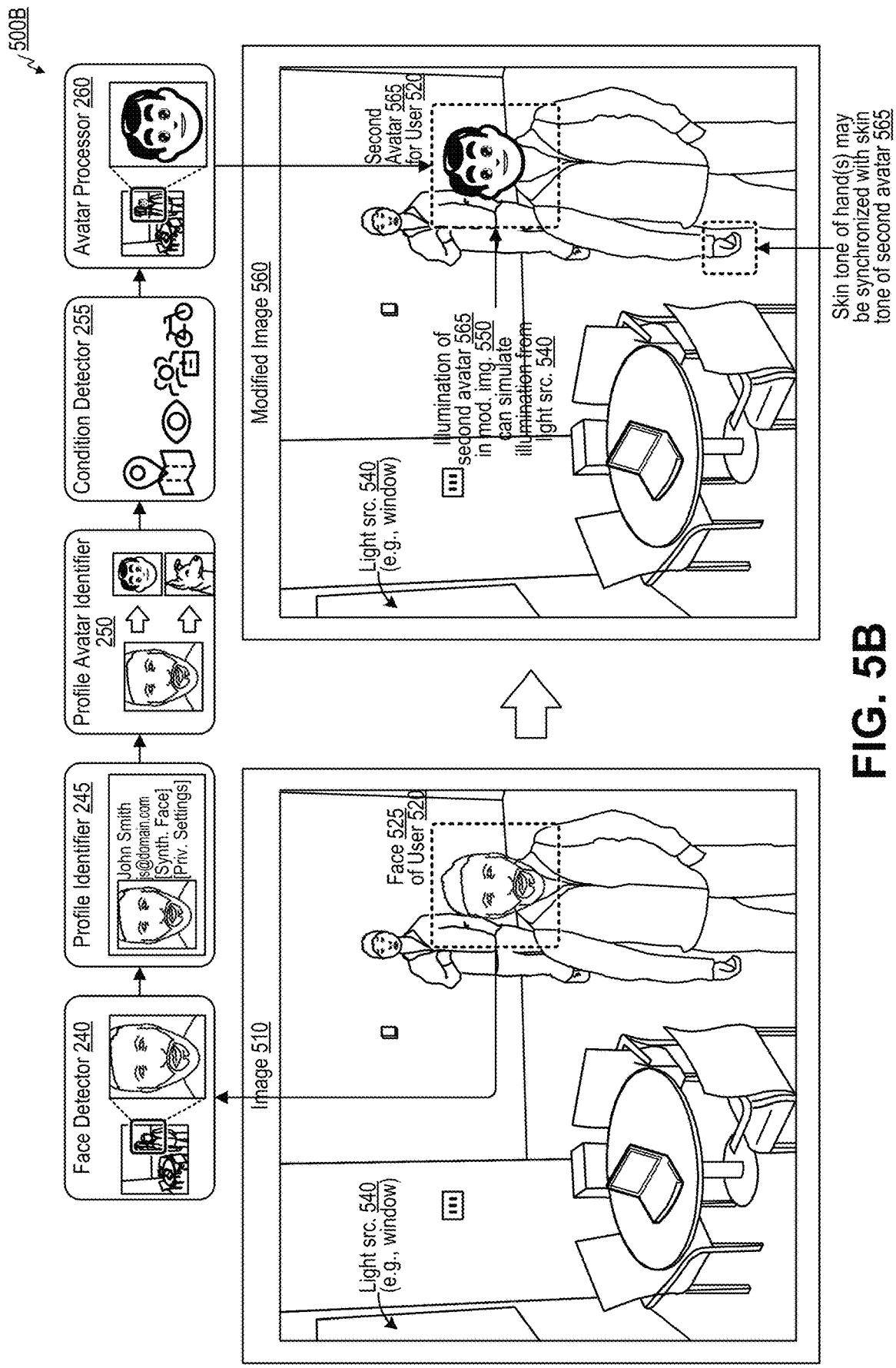
FIG. 5B is a conceptual diagram illustrating generation of a modified image from the image of FIG. 5A by using a second avatar for a user in place of the representation of the user in the image, in accordance with some examples.

FIG. 5B is a conceptual diagram 500B illustrating generation of a modified image 560 from the image 510 of FIG. 5A by using a second avatar 565 for the user 520 in place of the representation of the user 520 in the image 510. As indicated with respect to FIG. 5A, the profile avatar identifier 250 identifies, based on the profile for the user 520, avatars that can be used for the user 520 under different conditions. These avatars include at least the first avatar 530 of FIG. 5A and a second avatar 565 of FIG. 5B. The condition detector 255 identifies which of the condition(s) associated with the profile (identified by the profile identifier 245) are met and which of the condition(s) associated with the profile (identified by the profile identifier 245) are not met, and produces a different result in FIG. 5B compared to FIG. 5A. The profile avatar identifier 250 and/or the condition detector 255 select the second avatar 565 to represent the user 520 in the modified image 560 based on the determination by the condition detector 255 of which of the conditions are and/or are not met. The avatar processor 260 generates the modified image 560 by modifying the image 510 to use the second avatar 565 to represent the user 520 in place of the representation of the user 520 in the image 510. The second avatar 565 is represented as more realistic and human-looking, and more similar in appearance to the appearance to the user 520 himself, for instance wearing similar clothing to the user 520. Thus, the conditions associated with use of the second avatar 565 to represent the user 520 may include, for example, conditions under which viewers of the second avatar 565 can have a closer relationship with the user 520 (e.g., friends or family) rather than strangers, where the user 520 might wish to use the first avatar 530 instead, which is more privacy-protecting.

Figure 5C:
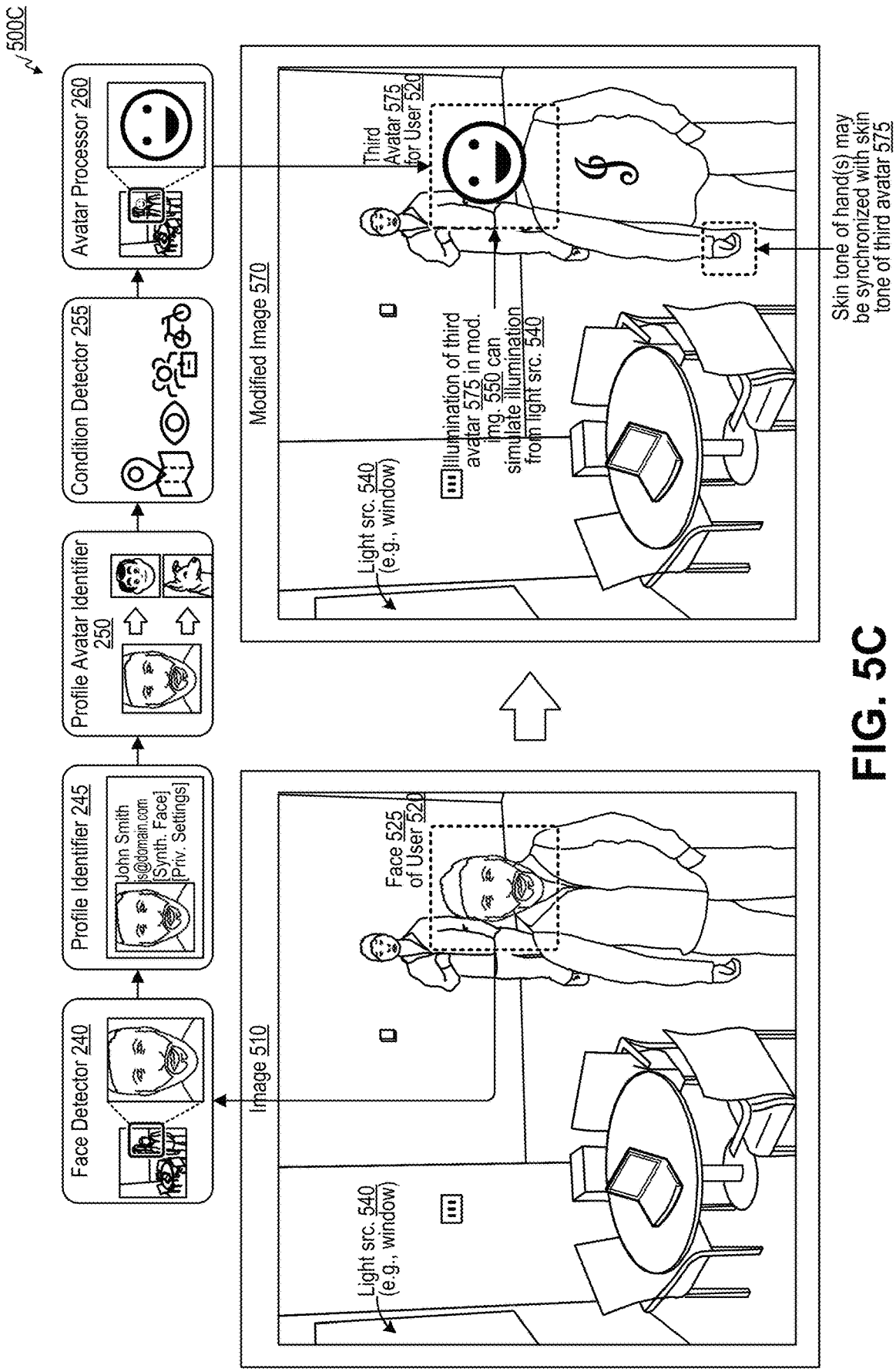
FIG. 5C is a conceptual diagram illustrating generation of a modified image from the image of FIG. 5A by using a third avatar for a user in place of the representation of the user in the image, in accordance with some examples.

FIG. 5C is a conceptual diagram 500C illustrating generation of a modified image 570 from the image 510 of FIG. 5A by using a third avatar 575 for the user 520 in place of the representation of the user 520 in the image 510. As indicated with respect to FIG. 5A, the profile avatar identifier 250 identifies, based on the profile for the user 520, avatars that can be used for the user 520 under different conditions. These avatars include at least the first avatar 530 of FIG. 5A, the second avatar 565 of FIG. 5B, and a third avatar 575 of FIG. 5C. The condition detector 255 identifies which of the condition(s) associated with the profile (identified by the profile identifier 245) are met and which of the condition(s) associated with the profile (identified by the profile identifier 245) are not met, and produces a different result in FIG. 5C compared to FIG. 5A and FIG. 5B. The profile avatar identifier 250 and/or the condition detector 255 select the third avatar 575 to represent the user 520 in the modified image 570 based on the determination by the condition detector 255 of which of the conditions are and/or are not met. The avatar processor 260 generates the modified image 570 by modifying the image 510 to use the third avatar 575 to represent the user 520 in place of the representation of the user 520 in the image 510. The third avatar 575 is represented as having a cartoony smiley face. The conditions associated with use of the third avatar 575 to represent the user 520 may include, for example, conditions under which the user 520 has indicated that he/she is happy. In some examples, a similar avatar to the third avatar 575 may be used with a frowning face, for example in conditions where the user 520 is feeling sad.

Figure 6B:
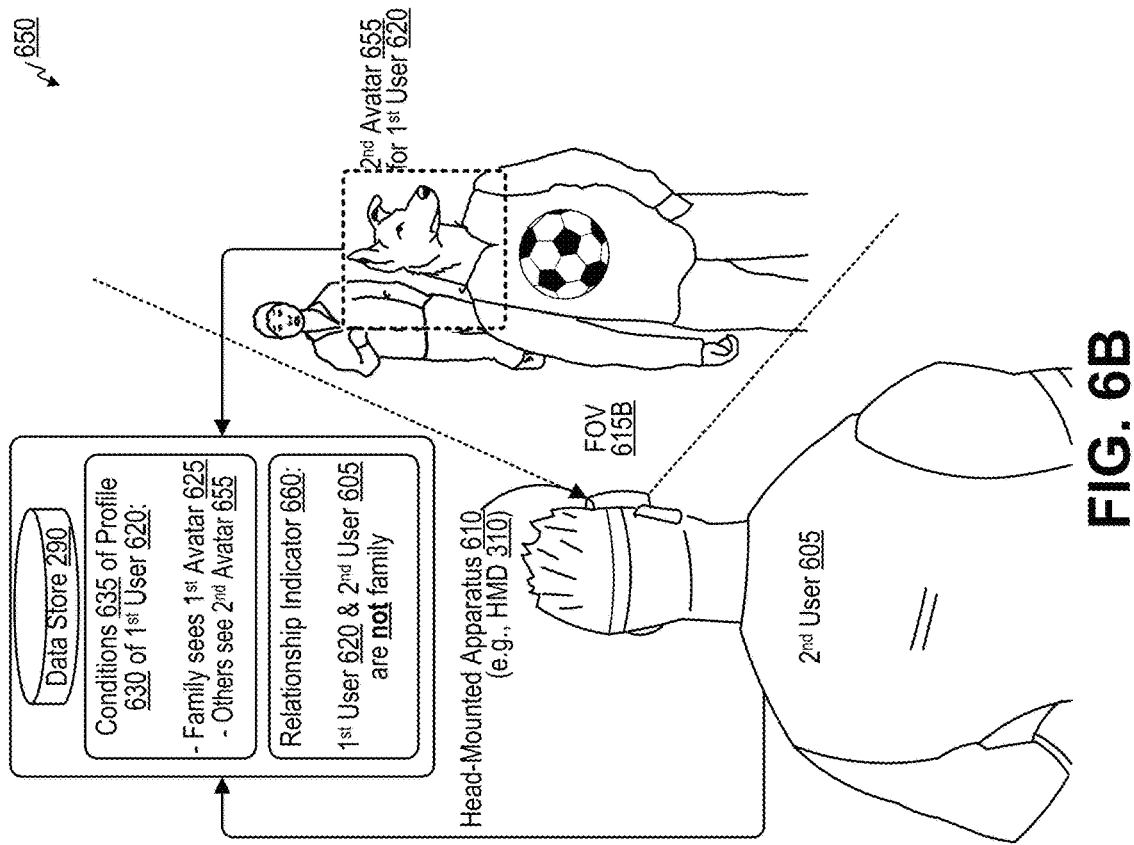
FIG. 6B is a conceptual diagram illustrating the second user using the head-mounted apparatus to view the interactive environment that includes the first user who is represented by a second avatar that is displayed to the second user through the head-mounted apparatus based on one or more conditions, in accordance with some examples.
Figure 6A:
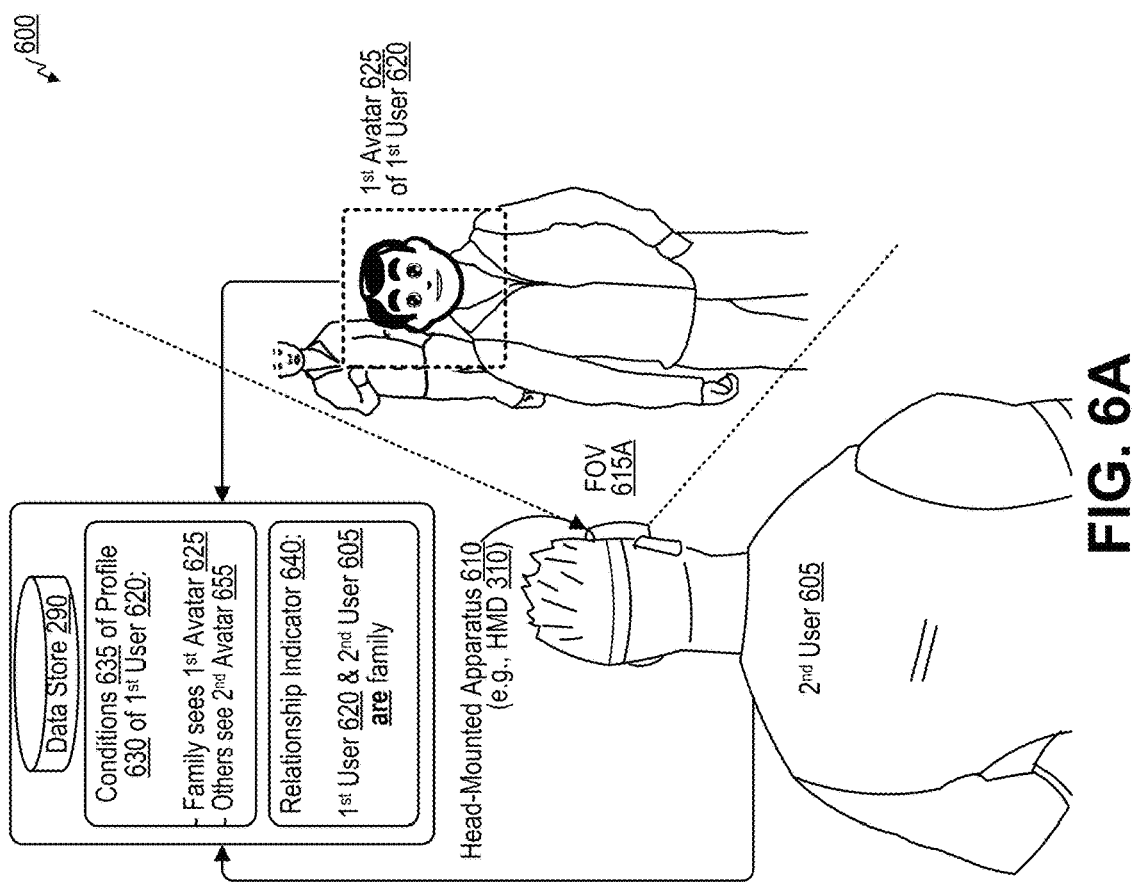
FIG. 6A is a conceptual diagram illustrating a second user using a head-mounted apparatus to view an interactive environment that includes a first user who is represented by a first avatar that is displayed to the second user through the head-mounted apparatus based on one or more conditions, in accordance with some examples.

FIG. 6A is a conceptual diagram 600 illustrating a second user 605 using a head-mounted apparatus 610 to view an interactive environment that includes a first user 620 who is represented by a first avatar 625 that is displayed to the second user 605 through the head-mounted apparatus 610 based on conditions 635 associated with the first user 620 and a relationship indicator 640 indicating a familial relationship between the second user 605 and the first user 620. The head-mounted apparatus 610 is an example of the HMD 310. The head-mounted apparatus 610 displays, to the second user 605, a field of view (FOV) 615A that includes the first avatar 625 representing the first user 620. The data store 290 stores the conditions 635 of the first user 620 in the profile 630 of the first user 620. The profile 630 is an example of a profile identified using the profile identifier 245. The conditions 635 of the first user 620 include an approved list, indicating that family members of the first user 620 are presented with the first avatar 625 to represent the first user 620, while others are presented with the second avatar 655 to represent the first user 620. The data store 290 also stores a relationship indicator 640 indicating that the second user 605 and the first user 620 are indeed family. Thus, the second user 605 is on the approved list of the first user 620. The first avatar 625 may be a realistic avatar that resembles the true appearance of the first user 620, similarly to the second avatar 565 of FIG. 5B. The second avatar 655 is a less realistic avatar that is distinct from the true appearance of the first user 620, similarly to the first avatar 530 of FIG. 5A or the third avatar 575 of FIG. 5C. Thus, the first avatar 625 (e.g., the realistic avatar) is presented to the second user 605 in the FOV 615A via the head-mounted apparatus 610 as the selected representation of the first user 620 because the conditions 635 associated with the first user 620 indicate that different avatars should be presented to different users based on relationship type (and/or relationship category), and because the first user 620 and second user 605 are family as indicated by the relationship indicator 640.

FIG. 6B is a conceptual diagram 650 illustrating the second user 605 using the head-mounted apparatus 610 to view the interactive environment that includes the first user 620 who is represented by a second avatar 655 that is displayed to the second user 605 through the head-mounted apparatus 610 based on conditions 635 associated with the first user 620 and a relationship indicator 660 indicating lack of a familial relationship between the second user 605 and the first user 620. The relationship indicator 660 of FIG. 6B indicates that the second user 605 and the first user 620 are not family, unlike the relationship indicator 640 of FIG. 6A. Thus, the second user 605 is not on the approved list for the first avatar 625 in the conditions 635 of the first user 620. Thus, the second avatar 655 (e.g., the non-realistic avatar) is presented to the second user 605 in the FOV 615B via the head-mounted apparatus 610 as the selected representation of the first user 620 because the conditions 635 associated with the first user 620 indicate that different avatars should be presented to different users based on relationship type (and/or relationship category), and because the first user 620 and second user 605 are not family as indicated by the relationship indicator 660.

In some examples, the true representation of a user (e.g., the first user 620) can be presented (e.g., unmodified or processed but without avatar representation) to a viewing user (e.g., the second user 605) instead of any avatar if the condition detector 255 determines that certain conditions (e.g., conditions 635) are met, or are not met. For instance, in the context of FIG. 5A-5C, in certain conditions, the image 510 may be presented to the viewing user (e.g., the second user 605), allowing the viewing user (e.g., the second user 605) to see the true representation of a user (e.g., the first user 620, the user 520).

Figure 7:
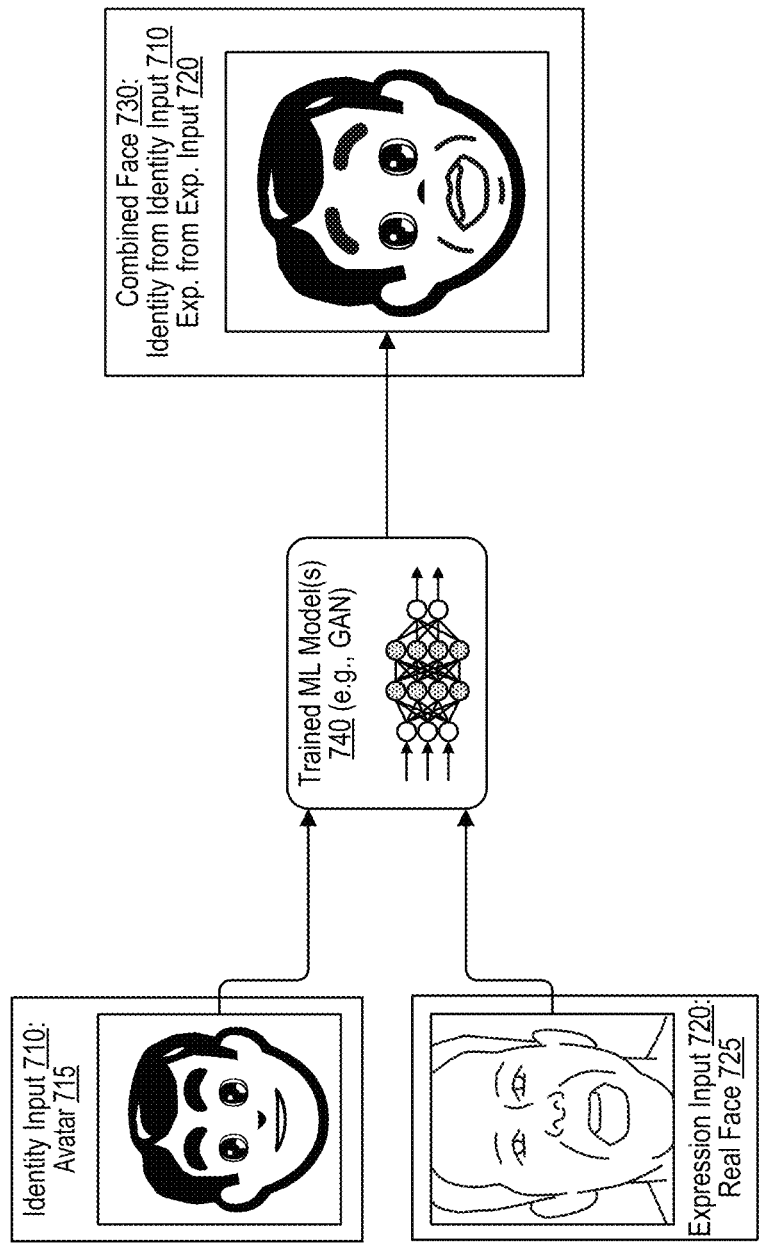
FIG. 7 is a conceptual diagram illustrating combining an identity input and an expression input to generate a combined face with an identity of the identity input and an expression of the expression input, in accordance with some examples.

FIG. 7 is a conceptual diagram 700 illustrating combining an identity input 710 and an expression input 720 to generate a combined face 730 with an identity of the identity input 710 and an expression of the expression input 720. In particular, the combined face 730 is generated using the trained ML model(s) 740 based on use of the identity input 710 and an expression input 720 as inputs into the trained ML model(s) 740 and/or as training data for training the trained ML model(s) 740. The trained ML model(s) 740 can be examples of one or more of the trained ML model(s) 295 that are used by the condition detector 255 and/or the avatar processor 260. The trained ML model(s) 740 can be part of the condition detector 255 and/or the avatar processor 260.

In the example illustrated in FIG. 7, the identity input 710 is an avatar 715 used to represent a user. In the example illustrated in FIG. 7, the expression input 720 is a real face 725 of the user who is to be represented by the avatar 715. Various facial features and/or facial attributes representing the identity of the identity input 710 (e.g., the avatar 715) appear in the combined face 730. For instance, the combined face 730 includes the hairstyle, eyebrow thickness, eye shape, facial feature proportions, and overall artistic style of the identity input 710 (e.g., avatar 715). Various facial features and/or facial attributes representing the expression of the expression input 720 appear in the combined face 730. For instance, the combined face 730 includes the mouth shape and expression, facial wrinkles, eyebrow arch, and/or eyebrow orientation of the expression input 720.

In some examples, the trained ML model(s) 740 can be trained (e.g., by the user device 210, the user device 220, the server(s) 205, and/or another system) to generate combined faces (e.g., combined face 730) using training data. In some examples, the training that includes identity input images (e.g., identity input 710) and expression input images (e.g., expression input 720) of real and/or artistic faces and pre-generated combined faces (e.g., combined face 730) using identity features from the respective includes identity input images and expression features from the respective expression input images. In some examples, the trained machine learning model(s) 740 can include one or more generative adversarial networks (GANs) and/or other deep-learning (DL) based generative ML model(s). In some examples, the identity input is an example of an avatar 715, which may be an example of an avatar identified in the profile of a user by the profile avatar identifier 250, the first avatar 530, the second avatar 565, the third avatar 575, the first avatar 625, the second avatar 655, or a combination thereof. In some examples, the expression input is an example of a real face 725 of a user to be represented by a version of the avatar 715, such as the face 525 or another face detected using the face detector 240. Use of a combined face 730 with an identity of the identity input 710 (e.g., avatar 715) and an expression of the expression input 720 (e.g., real face 725) can allow the viewing user to see the mouth moving of the user represented by the avatar, to see when the user represented by the avatar is smiling or frowning, to see other facial expressions on the face of the user represented by the avatar, and so forth. This enhances immersion with, flexibility, customization, personalization, and expressivity for network-based interactive systems, all while increasing privacy and security by not revealing the user's identity unless the user chooses to do so.

Figure 8:
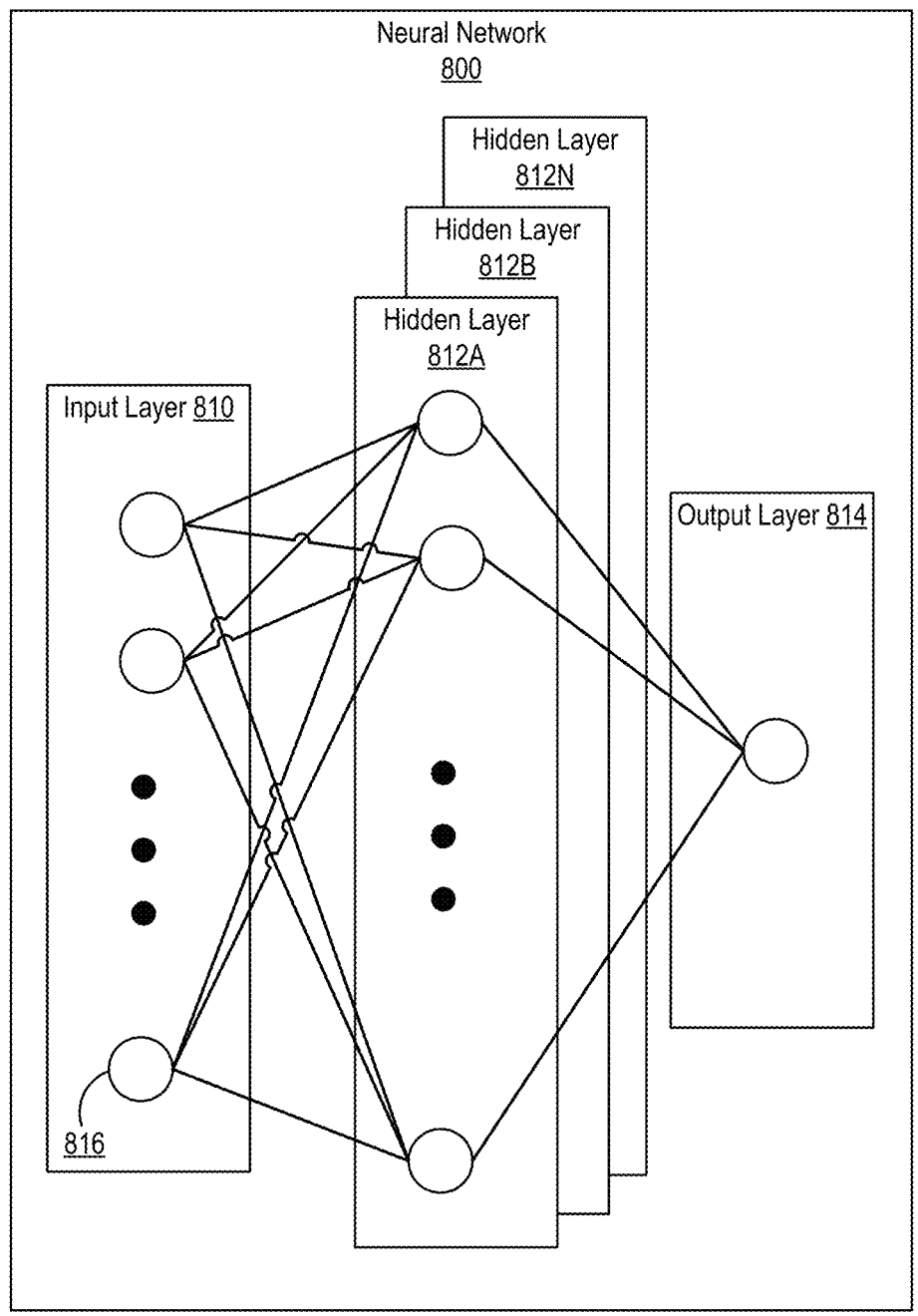
FIG. 8 is a block diagram illustrating an example of a neural network that can be used for image processing operations, in accordance with some examples.

FIG. 8 is a block diagram illustrating an example of a neural network (NN) 800 that can be used for media processing operations. The neural network 800 can include any type of deep network, such as a convolutional neural network (CNN), an autoencoder, a deep belief net (DBN), a Recurrent Neural Network (RNN), a Generative Adversarial Networks (GAN), and/or other type of neural network. The neural network 800 may be an example of one of the trained ML model(s) 295, the trained ML model(s) 740, trained ML model(s) 740, one or more trained ML model(s) used in the process 900, or a combination thereof. The neural network 800 may used by the face detector 240, the profile identifier 245, the profile avatar identifier 250, the condition detector 255, the avatar processor 260, or a combination thereof.

An input layer 810 of the neural network 800 includes input data. The input data of the input layer 810 can include data representing the pixels of one or more input image frames. In some examples, the input data of the input layer 810 includes data representing the pixels of image data (e.g., an image captured by the image capture and processing system 100, an image of the sensor data 235 captured by the sensor(s) 230, an image captured by one of the cameras 330A-330D, an image captured by one of the cameras 430A-430D, the image 510, an image of the user 620 before processing to include the first avatar 625 or the second avatar 655, the identity input 710, the expression input 720, the image with a representation of the first user of operation 905, or a combination thereof.

The images can include image data from an image sensor including raw pixel data (including a single color per pixel based, for example, on a Bayer filter) or processed pixel values (e.g., RGB pixels of an RGB image). The neural network 800 includes multiple hidden layers 812A, 812B, through 812N. The hidden layers 812A, 812B, through 812N include "N" number of hidden layers, where "N" is an integer greater than or equal to one. The number of hidden layers can be made to include as many layers as needed for the given application. The neural network 800 further includes an output layer 814 that provides an output resulting from the processing performed by the hidden layers 812A, 812B, through 812N.

In some examples, the output layer 814 can provide an output image, such the display avatar data 265, the avatar 530, the modified image 550, the modified image 560, the modified image 570, the FOV 615A with the first avatar 625, the FOV 615B with the second avatar 655, the avatar 715, the combined face 730, the display avatar of operations 910-915, or a combination thereof. In some examples, the output layer 814 can provide other types of data as well, such as face detection data for the face detector 240, face recognition data for the face detector 240 and/or profile identifier 245, condition detection by the condition detector 255, or a combination thereof.

The neural network 800 is a multi-layer neural network of interconnected filters. Each filter can be trained to learn a feature representative of the input data. Information associated with the filters is shared among the different layers and each layer retains information as information is processed.

In some cases, the neural network 800 can include a feed-forward network, in which case there are no feedback connections where outputs of the network are fed back into itself. In some cases, the network 800 can include a recurrent neural network, which can have loops that allow information to be carried across nodes while reading in input.

In some cases, information can be exchanged between the layers through node-to-node interconnections between the various layers. In some cases, the network can include a convolutional neural network, which may not link every node in one layer to every other node in the next layer. In networks where information is exchanged between layers, nodes of the input layer 810 can activate a set of nodes in the first hidden layer 812A. For example, as shown, each of the input nodes of the input layer 810 can be connected to each of the nodes of the first hidden layer 812A. The nodes of a hidden layer can transform the information of each input node by applying activation functions (e.g., filters) to this information. The information derived from the transformation can then be passed to and can activate the nodes of the next hidden layer 812B, which can perform their own designated functions. Example functions include convolutional functions, downscaling, upscaling, data transformation, and/or any other suitable functions. The output of the hidden layer 812B can then activate nodes of the next hidden layer, and so on. The output of the last hidden layer 812N can activate one or more nodes of the output layer 814, which provides a processed output image. In some cases, while nodes (e.g., node 816) in the neural network 800 are shown as having multiple output lines, a node has a single output and all lines shown as being output from a node represent the same output value.

In some cases, each node or interconnection between nodes can have a weight that is a set of parameters derived from the training of the neural network 800. For example, an interconnection between nodes can represent a piece of information learned about the interconnected nodes. The interconnection can have a tunable numeric weight that can be tuned (e.g., based on a training dataset), allowing the neural network 800 to be adaptive to inputs and able to learn as more and more data is processed.

The neural network 800 is pre-trained to process the features from the data in the input layer 810 using the different hidden layers 812A, 812B, through 812N in order to provide the output through the output layer 814.

Figure 9:
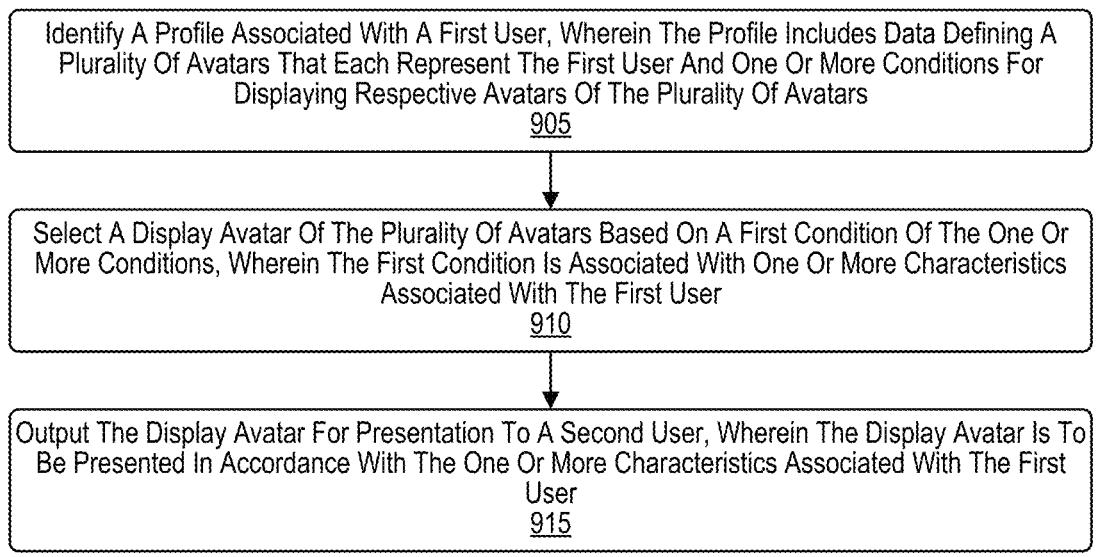
FIG. 9 is a flow diagram illustrating an imaging process, in accordance with some examples.

FIG. 9 is a flow diagram illustrating a user persona management process 900. The user persona management process 900 may be performed by a user persona management system. In some examples, the user persona management system can include, for example, the image capture and processing system 100, the image capture device 105A, the image processing device 105B, the image processor 150, the ISP 154, the host processor 152, the imaging system 200A, the imaging system 200B, the server(s) 205, the user device 210, the user device 220, the HMD 310, the mobile handset 410, the imaging system(s) of FIGS. 5A-5C, the head-mounted apparatus 610, the trained ML model(s) 740, neural network 800, the computing system 1000, the processor 1010, or a combination thereof.

At operation 905, the user persona management system is configured to, and can, identify a profile associated with a first user. The profile includes data defining a plurality of avatars that each represent the first user and one or more conditions for displaying respective avatars of the plurality of avatars. Examples of the first user include the user 215, the user 225, a user whose face is detected in the sensor data 235 using the face detector 240, a user whose profile is identified using the profile identifier 245, the user 320 of the HMD 310, a user of the mobile handset 410, the user 520, the first user 620, the second user 605, a user represented by the avatar 715 in the identity input 710, a user whose real face 725 is depicted in the expression input 720, a user who is depicted in an input image provided to an input layer 810 of the NN 800, any other user(s) described herein, or a combination thereof. Examples of the profile include a profile identified using the profile identifier 245, a profile stored in the data store 290, the profile 630 of the first user 620, any other profile(s) described herein, or a combination thereof. Examples of the plurality of avatars include avatar(s) identified using the profile avatar identifier 250 as corresponding to a profile identified using the profile identifier 245, avatar(s) processed using the avatar processor 260, avatar(s) represented in the display avatar data 265, avatar(s) stored in the data store 290, the first avatar 530, the second avatar 565, the third avatar 575, the first avatar 625, the second avatar 655, the avatar 715, the combined face 730, an avatar input into the input layer 810 of the NN 800, an avatar output via the output layer 814 of the NN 800, any other avatar(s) described herein, or a combination thereof. Examples of the conditions include conditions that are detected and/or detectable by the condition detector 255, conditions associated with a profile identified using the profile identifier 245, conditions identified in the data store 290, the conditions 635 of the profile 630, any other condition(s) described herein, or a combination thereof.

In some examples, identifying the profile associated with the first user includes identifying the profile associated with the first user based on one or more communications from a user device associated with the first user. Examples of the user device associated with the first user include the image capture and processing system 100, the user device 210, the user device 220, the HMD 310, the mobile handset 410, a computing system 1000, or a combination thereof. In some examples, the one or more communications include wireless communications, such as Bluetooth® communications or wireless local area network (WLAN) communications.

In some examples, the user persona management system is configured to, and can, receive an image of an environment. In some examples, the user persona management system includes an image sensor connector that coupled and/or connects the image sensor to a remainder of the user persona management system (e.g., including the processor and/or the memory of the user persona management system), In some examples, the user persona management system receives the image data from the image sensor by receiving the image data from, over, and/or using the image sensor connector.

Examples of the image sensor includes the image sensor 130, the sensor(s) 230, the first camera 330A, the second camera 330B, the third camera 330C, the fourth camera 330D, the first camera 430A, the second camera 430B, the third camera 430C, the fourth camera 430D, an image sensor that captures the image 510, an image sensor used to capture an image used as input data for the input layer 810 of the NN 800, the input device 1045, another image sensor described herein, another sensor described herein, or a combination thereof.

Examples of the image data include image data captured using the image capture and processing system 100, the sensor data 235 captured using image sensor(s) of the sensor(s) 230, image data captured using the first camera 330A, image data captured using the second camera 330B, image data captured using the third camera 330C, image data captured using the fourth camera 330D, image data captured using the first camera 430A, image data captured using the second camera 430B, image data captured using the third camera 430C, image data captured using the fourth camera 430D, the image 510, an image of the real face 725 used as the expression input 720, an image used as input data for the input layer 810 of the NN 800, an image captured using the input device 1045, another image described herein, another set of image data described herein, or a combination thereof.

In some examples, the user persona management system is configured to, and can, detect at least a portion of the first user (e.g., at least a portion of a face of the first user) in the image. The one or more processors can identify the profile associated with the first user (as in operation 905) based on at least the portion of the first user being detected in the image (e.g., based on facial detection and/or facial recognition).

At operation 910, the user persona management system is configured to, and can, select a display avatar of the plurality of avatars based on a first condition of the one or more conditions, wherein the first condition is associated with one or more characteristics associated with the first user. Examples of the first condition include any of the examples of the one or more conditions listed above.

Examples of the one or more characteristics associated with the first user include, for instance, a location of the first user in the real environment, a location of a representation (e.g., avatar) of the first user in an environment that is at least partially virtual, an activity performed by the first user in the real environment, an activity performed by the representation (e.g., avatar) of the first user in the environment that is at least partially virtual, who (e.g., the second user) is viewing the first user in the real environment, who (e.g., the second user) is viewing the representation (e.g., avatar) of the first user in the environment that is at least partially virtual, a location of someone (e.g., the second user) who is viewing the first user in the real environment and/or who is viewing the representation (e.g., avatar) of the first user in the environment that is at least partially virtual, an activity performed by of someone (e.g., the second user) who is viewing the first user in the real environment and/or who is viewing the representation (e.g., avatar) of the first user in the environment that is at least partially virtual, other characteristic(s) described herein, or a combination thereof.

In some examples, the one or more characteristics associated with the first user includes an identity of the second user that the display avatar is to be presented to, and the first condition corresponds to whether the identity of the second user is identified in a predetermined data structure corresponding to the first user. For instance, if the second user has a first specified identity (e.g., of a friend or family member of the first user), the second user may be presented with a first avatar representing the first user, while if the second user has a second specified identity (e.g., of a stranger to the first user), the second user may be presented with a second avatar representing the first user. For instance, the conditions 635 can be understood to be related to the identity of the second user 605, for instance based on whether or not the second user 605 is a family member of the first user 605.

In some examples, the one or more characteristics associated with the first user includes a category of relationship between the second user that the display avatar is to be presented to and the first user, and the first condition corresponds to whether the category of relationship is identified in a predetermined data structure corresponding to the first user. For instance, if the first user and the second user have a first specified relationship type (e.g., family members), the second user may be presented with a first avatar representing the first user, while if the first user and the second user have a second specified relationship type (e.g., co-workers), the second user may be presented with a second avatar representing the first user. For instance, the conditions 635 can be understood to be related to a relationship type between the first user 620 and the second user 605, for instance based on whether or not the first user 620 and the second user 605 have a specified category of relationship (e.g., family members).

In some examples, the one or more characteristics associated with the first user includes a location of the first user in an environment, and the first condition corresponds to whether the location of the first user in the environment falls within a predetermined area, a predetermined area type, a predetermined location, a predetermined location type, and/or a predetermined environment type in the environment identified in a predetermined data structure corresponding to the first user. The environment may be a real environment or a virtual environment. For instance, if the first user is located in a first area of a real or virtual environment (e.g., a virtual or real home of the first user), the second user may be presented with a first avatar representing the first user, while if the first user is located in a second area of the real or virtual environment (e.g., a virtual or real concert venue), the second user may be presented with a second avatar representing the first user.

In some examples, the one or more characteristics associated with the first user includes a location of the second user in an environment, and the first condition corresponds to whether the location of the second user in the environment falls within a predetermined range of at least one of a predetermined location and/or a predetermined location type in the environment identified in a predetermined data structure corresponding to the first user. The environment may be a real environment or a virtual environment. For instance, if the second user is located within range of a first location of a real or virtual environment (e.g., a center of a virtual or real home of the first user), the second user may be presented with a first avatar representing the first user, while if the second user is located within range of a second location of the real or virtual environment (e.g., a stage of virtual or real concert venue), the second user may be presented with a second avatar representing the first user.

In some examples, the one or more characteristics associated with the first user includes an activity performed by the first user, and the first condition corresponds to whether the activity is identified in a predetermined data structure corresponding to the first user. For instance, if the first user is performing a first activity in a real or virtual environment (e.g., playing a game), the second user may be presented with a first avatar representing the first user, while if the first user is located in a second area of the real or virtual environment (e.g., watching a video), the second user may be presented with a second avatar representing the first user.

In some examples, the one or more characteristics associated with the first user includes an activity performed by the second user, and the first condition corresponds to whether the activity is identified in a predetermined data structure corresponding to the first user. For instance, if the second user is performing a first activity in a real or virtual environment (e.g., playing a game), the second user may be presented with a first avatar representing the first user, while if the second user is located in a second area of the real or virtual environment (e.g., watching a video), the second user may be presented with a second avatar representing the first user.

At operation 915, the imaging system is configured to, and can, output the display avatar for presentation to a second user, wherein the display avatar is to be presented in accordance with the one or more characteristics associated with the first user. Examples of the second user include any of the examples of the first user listed above.

In some examples, the user persona management system is configured to, and can, identify a second profile associated with a third user. The second profile includes data defining a second plurality of avatars that each represent the third user and a second set of one or more conditions for displaying respective avatars of the second plurality of avatars. The user persona management system can select a second display avatar of the second plurality of avatars based on a second condition of the second set of one or more conditions. The second condition is associated with a second set of one or more characteristics associated with the second user. The user persona management system can output the second display avatar for presentation to the second user. The second display avatar is to be presented in accordance with the second set of one or more characteristics associated with the third user. Examples of the third user include any of the examples of the first user and/or the second user listed above. Examples of the second profile include any of the examples of the profile listed above. Examples of the second plurality of avatars include any of the examples of the plurality of avatars listed above. Examples of the second set of one or more conditions include any of the examples of the one or more conditions listed above. Examples of the second set of one or more characteristics include any of the examples of the one or more characteristics listed above.

In some examples, the user persona management system is configured to, and can, identify a second profile associated with a third user. The second profile includes data defining a second plurality of avatars that each represent the third user and a second set of one or more conditions for displaying respective avatars of the second plurality of avatars. The user persona management system can select a second display avatar of the second plurality of avatars based on none of the second set of one or more conditions being met. The user persona management system can output the second display avatar for presentation to the second user. Examples of the third user include any of the examples of the first user and/or the second user listed above. Examples of the second profile include any of the examples of the profile listed above. Examples of the second plurality of avatars include any of the examples of the plurality of avatars listed above. Examples of the second set of one or more conditions include any of the examples of the one or more conditions listed above.

In some examples, the user persona management system is configured to, and can, receive an image of an environment and detect at least a portion (e.g., a face) of the first user in the image. Identifying the profile associated with the first user can be based on at least the portion of the first user being detected in the image. The user persona management system can generate a modified image at least in part by modifying the image to use the display avatar in place of at least the portion of the first user in the image according to the one or more characteristics of the first user. Outputting the display avatar for presentation to the second user can include outputting the modified image for presentation to the second user. Examples of the image include the image data captured using the image capture and processing system 100, the sensor data 235 captured using image sensor(s) of the sensor(s) 230, image data captured using the first camera 330A, image data captured using the second camera 330B, image data captured using the third camera 330C, image data captured using the fourth camera 330D, image data captured using the first camera 430A, image data captured using the second camera 430B, image data captured using the third camera 430C, image data captured using the fourth camera 430D, the image 510, an image of the real face 725 used as the expression input 720, an image used as input data for the input layer 810 of the NN 800, an image captured using the input device 1045, another image described herein, another set of image data described herein, or a combination thereof. Examples of the modified image include the display avatar data 265, modified image(s) displayed using the display(s) 340, modified image(s) displayed using the display(s) 440, the modified image 550, the modified image 560, the modified image 570, the FOV 615A, the FOV 615B, an image including the avatar 715, an image including the combined face 730, an image output using the output layer 814 of the NN 800, or a combination thereof.

In some examples, at least a portion of the environment in the image includes one or more virtual elements. In some examples, at least a portion of the image of the environment is captured by an image sensor, or is based on content captured by an image sensor (e.g., image sensor 130, sensor(s) 230). In some examples, generating the modified image includes using the display avatar and at least the portion of the first user in the image as inputs to a trained machine learning model (e.g., trained ML model(s) 295, trained ML model(s) 740, NN 800) that modifies the image to use the display avatar in place of at least the portion of the first user according to the one or more characteristics of the first user.

In some examples, the portion of the first user includes one or more facial features of the first user. In some examples, identifying the profile associated with the first user includes identifying an identity of the one or more facial features of the first user in the image using facial recognition (e.g., face detector 240).

In some examples, the user persona management system is configured to, and can, modify the display avatar based on one or more display preferences associated with the second user before outputting the display avatar for presentation to the second user. For instance, the display preferences of the second user may be indicative of a visual handicap of the second user, such as color-blindness or dyslexia, and the user persona management system can modify the display avatar to use colors that are distinguishable by users with color-blindness, and/or to use words, characters, and/or symbols that are readable by users with dyslexia. In some examples, the display preferences of the second user may be indicative of a preference not to see specified types of avatars, such as shirtless avatars, or avatars that include lewd imagery, blood, or specified words or designs. In some examples, the display preferences of the second user may be indicative of a preference to see specified types of avatars, or colors, or designs, and the like.

In some examples, the user persona management system is configured to, and can, select a second display avatar of the plurality of avatars based on a change from the first condition to a second condition of the one or more conditions. The user persona management system can transition from outputting the display avatar for presentation to the second user to outputting the second display avatar for presentation to the second user. The second display avatar is to be presented in accordance with the one or more characteristics associated with the first user. Examples of the second condition include any of the examples listed above with respect to the one or more conditions, or the first condition. For instance, the first user may change their location in the real world or in a virtual world, and the user persona management system can change which avatar represents the first user based on this change in location. Similarly, the first user may change their activity in the real world or in a virtual world, and the user persona management system can change which avatar represents the first user based on this change in activity. Similarly, a different second may be viewing the first user in the real world or in a virtual world, and the user persona management system can change which avatar represents the first user based on this change in viewership of the first user.

In some examples, the user persona management system is configured to, and can, generate the display avatar before outputting the display avatar for presentation to the second user. Generating the display avatar can include providing one or more inputs associated with the first user to a trained machine learning (ML) model that generates the display avatar based on the one or more inputs associated with the first user. Examples of the trained ML model include the trained ML model(s) 295, the trained ML model(s) 740, the NN 800, or a combination thereof. Examples of the one or more inputs include the identity input 710 and/or the expression input 720.

In some examples, the user persona management system is configured to, and can, identify a facial expression of the first user, and modify the display avatar to apply the facial expression to the display avatar before outputting the display avatar for presentation to the second user. For instance, the facial expression may be identified as part of the expression input 720, which the trained ML model(s) 740 can use to modify the display avatar (e.g., the avatar 715) to ply the facial expression to the display avatar to generate the combined face 730.

In some examples, the user persona management system is configured to, and can, identify a head pose of the first user, and modify the display avatar to apply the head pose to the display avatar before outputting the display avatar for presentation to the second user. The head pose may be applied similarly to the facial expression (e.g., using the trained ML model(s) 740), or may be mimicked by rendering and/or rotating the display avatar as appropriate based on the head pose (e.g., the match the head pose). Head pose can include head position, had orientation (e.g., pitch, yaw, and/or roll), facial expression, or a combination thereof.

In some examples, the user persona management system is configured to, and can, identify a lighting condition of the first user, and modify the display avatar to apply the lighting condition to the display avatar before outputting the display avatar for presentation to the second user. The lighting condition may be applied similarly to the facial expression (e.g., using the trained ML model(s) 740), or may be mimicked by rendering the display avatar with a similar lighting condition applied. An example of the lighting condition includes the illumination from the light source 540.

In some examples, the user persona management system is configured to, and can, cause the display avatar to be displayed using a display. In some examples, the user persona management system includes the display (e.g., output device(s) 270A, output device(s) 270B, output device 1035).

In some examples, the user persona management system is configured to, and can, transmit at least the display avatar to at least a user device associated with the second user using at least a communication interface. In some examples, the user persona management system includes the communication interface (e.g., output device(s) 270A, output device(s) 270B, output device 1035, communication interface 1040). Examples of the user device associated with the second user include the image capture and processing system 100, the user device 210, the user device 220, the HMD 310, the mobile handset 410, a computing system 1000, or a combination thereof.

In some examples, the user persona management system is, or includes, a head-mounted display (HMD) 310, a mobile handset 410, or a wireless communication device. In some examples, the user persona management system is configured to, and can, output the display avatar for presentation to the second user at least in part by transmitting (e.g., using a communication interface 1040) the display avatar to a user device associated with the second user. In some examples, the user persona management system can include one or more network servers (e.g., server(s) 205, computing system 1300).

In some examples, the user persona management system is configured to, and can, generate a modified image at least in part by modifying the image to use the display avatar in place of at least the portion of the first user in the image according to the one or more characteristics of the first user. To output the display avatar for presentation to the second user (as in operation 925), the user persona management system is configured to, and can, output the modified image for presentation to the second user.

In some examples, the user persona management system includes a display, and outputting the display avatar for presentation to the second user includes displaying at least the display avatar (in some examples, as part of the modified image) using the display. Examples of the display include the output device(s) 270A-270B, the display(s) 340 of the HMD 310, the display 440 of the mobile handset 410, the output device 1035, or a combination thereof.

In some examples, the user persona management system can includes: means for identifying a profile associated with a first user, wherein the profile includes data defining a plurality of avatars that each represent the first user and one or more conditions for displaying respective avatars of the plurality of avatars; means for selecting a display avatar of the plurality of avatars based on a first condition of the one or more conditions, wherein the first condition is associated with one or more characteristics associated with the first user; and means for outputting the display avatar for presentation to a second user, wherein the display avatar is to be presented In some examples, the means for identifying the profile associated with a first user includes the image capture and processing system 100, the image capture device 105A, the image processing device 105B, the image processor 150, the ISP 154, the host processor 152, the image sensor 130, the server(s) 205, the user device 210, the user device 220, the sensor(s) 230, the face detector 240, the profile identifier 245, the data store 290, the trained ML model(s) 295, the first camera 330A, the second camera 330B, the third camera 330C, the fourth camera 330D, the first camera 430A, the second camera 430B, the third camera 430C, the fourth camera 430D, an image sensor that captures the image 510, the trained ML model(s) 740, the NN 800, the input device 1045, or a combination thereof.

In some examples, the means for selecting the display avatar based on the first condition includes the server(s) 205, the user device 210, the user device 220, the profile identifier 245, the profile avatar identifier 250, the condition detector 255, the avatar processor 260, the data store 290, the trained ML model(s) 295, the profile 630, the conditions 635, the trained ML model(s) 740, the NN 800, or a combination thereof.

In some examples, the means for outputting the display avatar for presentation to the second user includes the server(s) 205, the user device 210, the user device 220, the profile avatar identifier 250, the avatar processor 260, the output device(s) 270A, the output device(s) 270B, the data store 290, the HMD 310, the display(s) 340, the earpiece 335, the display 440, the speakers 435A-435B, the trained ML model(s) 295, the trained ML model(s) 740, the NN 800, the output device 1035, the communication interface 1040, or a combination thereof.

In some examples, the processes described herein (e.g., the respective processes of FIGS. 1, 2A-2B, 5A-5C, 6A-6B, 7, 8, the process 900 of FIG. 9, and/or other processes described herein) may be performed by a computing device or apparatus. In some examples, the processes described herein can be performed by the image capture and processing system 100, the image capture device 105A, the image processing device 105B, the image processor 150, the ISP 154, the host processor 152, the imaging system 200A, the imaging system 200B, the server(s) 205, the user device 210, the user device 220, the HMD 310, the mobile handset 410, the imaging system(s) of FIGS. 5A-5C, the head-mounted apparatus 610, the trained ML model(s) 740, neural network 800, the user persona management system that performs the process 900, the computing system 1000, the processor 1010, or a combination thereof.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes described herein are illustrated as logical flow diagrams, block diagrams, or conceptual diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 10:
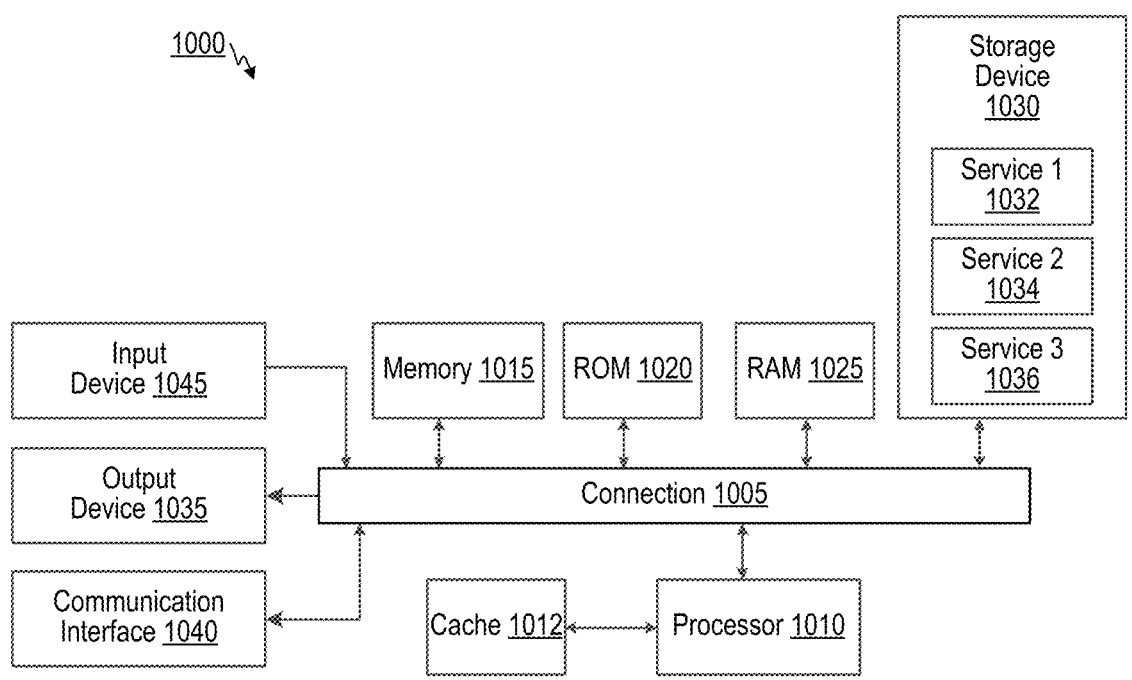
FIG. 10 is a diagram illustrating an example of a computing system for implementing certain aspects described herein.

FIG. 10 is a diagram illustrating an example of a system for implementing certain aspects of the present technology. In particular, FIG. 10 illustrates an example of computing system 1000, which can be for example any computing device making up internal computing system, a remote computing system, a camera, or any component thereof in which the components of the system are in communication with each other using connection 1005. Connection 1005 can be a physical connection using a bus, or a direct connection into processor 1010, such as in a chipset architecture. Connection 1005 can also be a virtual connection, networked connection, or logical connection.

In some aspects, computing system 1000 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1000 includes at least one processing unit (CPU or processor) 1010 and connection 1005 that couples various system components including system memory 1015, such as read-only memory (ROM) 1020 and random access memory (RAM) 1025 to processor 1010. Computing system 1000 can include a cache 1012 of high-speed memory connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms. In some instances, multimodal systems can enable a user to provide multiple types of input/output to communicate with computing system 1000. Computing system 1000 can include communications interface 1040, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 1002.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1030 can include software services, servers, services, etc., that when the code that defines such software is executed by the processor 1010, it causes the system to perform a function. In some aspects, a hardware service that performs a particular function can include the software component stored in a computer-readable medium in connection with the necessary hardware components, such as processor 1010, connection 1005, output device 1035, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1: An apparatus for user persona management, the apparatus comprising: a memory; and one or more processors coupled to the memory, the one or more processors configured to: identify a profile associated with a first user, wherein the profile includes data defining a plurality of avatars that each represent the first user and one or more conditions for displaying respective avatars of the plurality of avatars; select a display avatar of the plurality of avatars based on a first condition of the one or more conditions, wherein the first condition is associated with one or more characteristics associated with the first user; and output the display avatar for presentation to a second user, wherein the display avatar is to be presented in accordance with the one or more characteristics associated with the first user.

Aspect 2. The apparatus of Aspect 1, wherein the one or more characteristics associated with the first user includes an identity of the second user that the display avatar is to be presented to, wherein the first condition corresponds to whether the identity of the second user is identified in a predetermined data structure corresponding to the first user.

Aspect 3. The apparatus of any of Aspects 1 to 2, wherein the one or more characteristics associated with the first user includes a category of relationship between the second user that the display avatar is to be presented to and the first user, wherein the first condition corresponds to whether the category of relationship is identified in a predetermined data structure corresponding to the first user.

Aspect 4. The apparatus of any of Aspects 1 to 3, wherein the one or more characteristics associated with the first user includes a location of the first user in an environment, wherein the first condition corresponds to whether the location of the first user in the environment falls within at least one of a predetermined area, a predetermined area type, or a predetermined environment type in the environment identified in a predetermined data structure corresponding to the first user.

Aspect 5. The apparatus of any of Aspects 1 to 4, wherein the one or more characteristics associated with the first user includes an activity performed by the first user, wherein the first condition corresponds to whether the activity is identified in a predetermined data structure corresponding to the first user.

Aspect 6. The apparatus of any of Aspects 1 to 5, wherein, to identify the profile associated with the first user, the one or more processors are configured to identify the profile associated with the first user based on one or more communications from a user device associated with the first user.

Aspect 7. The apparatus of any of Aspects 1 to 6, wherein the one or more processors are configured to: identify a second profile associated with a third user, wherein the second profile includes data defining a second plurality of avatars that each represent the third user and a second set of one or more conditions for displaying respective avatars of the second plurality of avatars; select a second display avatar of the second plurality of avatars based on a second condition of the second set of one or more conditions, wherein the second condition is associated with a second set of one or more characteristics associated with the second user; and output the second display avatar for presentation to the second user, wherein the second display avatar is to be presented in accordance with the second set of one or more characteristics associated with the third user.

Aspect 8. The apparatus of any of Aspects 1 to 7, wherein the one or more processors are configured to: identify a second profile associated with a third user, wherein the second profile includes data defining a second plurality of avatars that each represent the third user and a second set of one or more conditions for displaying respective avatars of the second plurality of avatars; select a second display avatar of the second plurality of avatars based on none of the second set of one or more conditions being met; and output the second display avatar for presentation to the second user.

Aspect 9. The apparatus of any of Aspects 1 to 8, wherein the one or more processors are configured to: receive an image of an environment; detect at least a portion of the first user in the image, wherein the one or more processors are configured to identify the profile associated with the first user based on at least the portion of the first user being detected in the image; and generate a modified image at least in part by modifying the image to use the display avatar in place of at least the portion of the first user in the image according to the one or more characteristics of the first user, wherein, to output the display avatar for presentation to the second user, the one or more processors are configured to output the modified image for presentation to the second user.

Aspect 10. The apparatus of Aspect 9, wherein at least a portion of the environment in the image includes one or more virtual elements.

Aspect 11. The apparatus of any of Aspects 9 to 10, wherein at least a portion of the image of the environment is captured by an image sensor.

Aspect 12. The apparatus of any of Aspects 9 to 11, wherein, to generate the modified image, the one or more processors are configured to use the display avatar and at least the portion of the first user in the image as inputs to a trained machine learning model that modifies the image to use the display avatar in place of at least the portion of the first user according to the one or more characteristics of the first user.

Aspect 13. The apparatus of any of Aspects 9 to 12, wherein the portion of the first user includes one or more facial features of the first user.

Aspect 14. The apparatus of Aspect 13, wherein, to identify the profile associated with the first user, the one or more processors are configured to identify an identity of the one or more facial features of the first user in the image using facial recognition.

Aspect 15. The apparatus of any of Aspects 1 to 14, wherein the one or more processors are configured to: before outputting the display avatar for presentation to the second user, modify the display avatar based on one or more display preferences associated with the second user.

Aspect 16. The apparatus of any of Aspects 1 to 15, wherein the one or more processors are configured to: select a second display avatar of the plurality of avatars based on a change from the first condition to a second condition of the one or more conditions; and transition from outputting the display avatar for presentation to the second user to outputting the second display avatar for presentation to the second user, wherein the second display avatar is to be presented in accordance with the one or more characteristics associated with the first user.

Aspect 17. The apparatus of any of Aspects 1 to 16, wherein the one or more processors are configured to: generate the display avatar before outputting the display avatar for presentation to the second user, wherein, to generate the display avatar, the one or more processors are configured to provide one or more inputs associated with the first user to a trained machine learning model that generates the display avatar based on the one or more inputs associated with the first user.

Aspect 18. The apparatus of any of Aspects 1 to 17, wherein the one or more processors are configured to: identify a facial expression of the first user; and modify the display avatar to apply the facial expression to the display avatar before outputting the display avatar for presentation to the second user.

Aspect 19. The apparatus of any of Aspects 1 to 18, wherein the one or more processors are configured to: identify a head pose of the first user; and modify the display avatar to apply the head pose to the display avatar before outputting the display avatar for presentation to the second user.

Aspect 20. The apparatus of any of Aspects 1 to 19, wherein the one or more processors are configured to: identify a lighting condition of the first user; and modify the display avatar to apply the lighting condition to the display avatar before outputting the display avatar for presentation to the second user.

Aspect 21. The apparatus of any of Aspects 1 to 20, further comprising: a display, wherein the one or more processors are configured to cause the display avatar to be displayed using at least the display.

Aspect 22. The apparatus of any of Aspects 1 to 21, further comprising: a communication interface, wherein the one or more processors are configured to transmit at least the display avatar to at least a user device associated with the second user using at least the communication interface.

Aspect 23. The apparatus of any of Aspects 1 to 22, wherein the apparatus includes at least one of a head-mounted display (HMD), a mobile handset, or a wireless communication device.

Aspect 24. The apparatus of any of Aspects 1 to 23, wherein the apparatus includes one or more network servers, wherein the one or more processors are configured to output the display avatar for presentation to the second user at least in part by transmitting the display avatar to a user device associated with the second user.

Aspect 25. A method for user persona management, the method comprising: identifying a profile associated with a first user, wherein the profile includes data defining a plurality of avatars that each represent the first user and one or more conditions for displaying respective avatars of the plurality of avatars; selecting a display avatar of the plurality of avatars based on a first condition of the one or more conditions, wherein the first condition is associated with one or more characteristics associated with the first user; and outputting the display avatar for presentation to a second user, wherein the display avatar is to be presented in accordance with the one or more characteristics associated with the first user.

Aspect 26. The method of Aspect 25, wherein the one or more characteristics associated with the first user includes an identity of the second user that the display avatar is to be presented to, wherein the first condition corresponds to whether the identity of the second user is identified in a predetermined data structure corresponding to the first user.

Aspect 27. The method of any of Aspects 25 to 26, wherein the one or more characteristics associated with the first user includes a category of relationship between the second user that the display avatar is to be presented to and the first user, wherein the first condition corresponds to whether the category of relationship is identified in a predetermined data structure corresponding to the first user.

Aspect 28. The method of any of Aspects 25 to 27, wherein the one or more characteristics associated with the first user includes a location of the first user in an environment, wherein the first condition corresponds to whether the location of the first user in the environment falls within at least one of a predetermined area, a predetermined area type, or a predetermined environment type in the environment identified in a predetermined data structure corresponding to the first user.

Aspect 29. The method of any of Aspects 25 to 28, wherein the one or more characteristics associated with the first user includes an activity performed by the first user, wherein the first condition corresponds to whether the activity is identified in a predetermined data structure corresponding to the first user.

Aspect 30. The method of any of Aspects 25 to 29, wherein identifying the profile associated with the first user includes identifying the profile associated with the first user based on one or more communications from a user device associated with the first user.

Aspect 31. The method of any of Aspects 25 to 30, further comprising: identifying a second profile associated with a third user, wherein the second profile includes data defining a second plurality of avatars that each represent the third user and a second set of one or more conditions for displaying respective avatars of the second plurality of avatars; selecting a second display avatar of the second plurality of avatars based on a second condition of the second set of one or more conditions, wherein the second condition is associated with a second set of one or more characteristics associated with the second user; and outputting the second display avatar for presentation to the second user, wherein the second display avatar is to be presented in accordance with the second set of one or more characteristics associated with the third user.

Aspect 32. The method of any of Aspects 25 to 31, further comprising: identifying a second profile associated with a third user, wherein the second profile includes data defining a second plurality of avatars that each represent the third user and a second set of one or more conditions for displaying respective avatars of the second plurality of avatars; selecting a second display avatar of the second plurality of avatars based on none of the second set of one or more conditions being met; and outputting the second display avatar for presentation to the second user.

Aspect 33. The method of any of Aspects 25 to 32, further comprising: receiving an image of an environment; detecting at least a portion of the first user in the image, wherein identifying the profile associated with the first user is based on at least the portion of the first user being detected in the image; and generating a modified image at least in part by modifying the image to use the display avatar in place of at least the portion of the first user in the image according to the one or more characteristics of the first user, wherein outputting the display avatar for presentation to the second user includes outputting the modified image for presentation to the second user.

Aspect 34. The method of Aspect 33, wherein at least a portion of the environment in the image includes one or more virtual elements.

Aspect 35. The method of any of Aspects 33 to 34, wherein at least a portion of the image of the environment is captured by an image sensor.

Aspect 36. The method of any of Aspects 33 to 35, wherein generating the modified image includes using the display avatar and at least the portion of the first user in the image as inputs to a trained machine learning model that modifies the image to use the display avatar in place of at least the portion of the first user according to the one or more characteristics of the first user.

Aspect 37. The method of any of Aspects 33 to 36, wherein the portion of the first user includes one or more facial features of the first user.

Aspect 38. The method of Aspect 37, wherein identifying the profile associated with the first user includes identifying an identity of the one or more facial features of the first user in the image using facial recognition.

Aspect 39. The method of any of Aspects 25 to 38, further comprising: before outputting the display avatar for presentation to the second user, modifying the display avatar based on one or more display preferences associated with the second user.

Aspect 40. The method of any of Aspects 25 to 39, further comprising: selecting a second display avatar of the plurality of avatars based on a change from the first condition to a second condition of the one or more conditions; and transitioning from outputting the display avatar for presentation to the second user to outputting the second display avatar for presentation to the second user, wherein the second display avatar is to be presented in accordance with the one or more characteristics associated with the first user.

Aspect 41. The method of any of Aspects 25 to 40, further comprising: generating the display avatar before outputting the display avatar for presentation to the second user, wherein generating the display avatar includes providing one or more inputs associated with the first user to a trained machine learning model that generates the display avatar based on the one or more inputs associated with the first user.

Aspect 42. The method of any of Aspects 25 to 41, further comprising: identifying a facial expression of the first user; and modifying the display avatar to apply the facial expression to the display avatar before outputting the display avatar for presentation to the second user.

Aspect 43. The method of any of Aspects 25 to 42, further comprising: identifying a head pose of the first user; and modifying the display avatar to apply the head pose to the display avatar before outputting the display avatar for presentation to the second user.

Aspect 44. The method of any of Aspects 25 to 43, further comprising: identifying a lighting condition of the first user; and modifying the display avatar to apply the lighting condition to the display avatar before outputting the display avatar for presentation to the second user.

Aspect 45. The method of any of Aspects 25 to 44, further comprising: causing the display avatar to be displayed using a display.

Aspect 46. The method of any of Aspects 25 to 45, further comprising: causing the display avatar to be transmitted to at least a user device associated with the second user using at least a communication interface.

Aspect 47. The method of any of Aspects 25 to 46, wherein an apparatus is configured to perform the method, wherein the apparatus includes at least one of a head-mounted display (HMD), a mobile handset, or a wireless communication device.

Aspect 48: A non-transitory computer-readable medium having stored thereon instructions that, when executed by one or more processors, cause the one or more processors to: identify a profile associated with a first user, wherein the profile includes data defining a plurality of avatars that each represent the first user and one or more conditions for displaying respective avatars of the plurality of avatars; select a display avatar of the plurality of avatars based on a first condition of the one or more conditions, wherein the first condition is associated with one or more characteristics associated with the first user; and output the display avatar for presentation to a second user, wherein the display avatar is to be presented in accordance with the one or more characteristics associated with the first user.

Aspect 49: The non-transitory computer-readable medium of Aspect 48, further comprising operations according to any of Aspects 2 to 24, and/or any of Aspects 26 to 47.

Aspect 50: An apparatus for image processing, the apparatus comprising: means for identifying a profile associated with a first user, wherein the profile includes data defining a plurality of avatars that each represent the first user and one or more conditions for displaying respective avatars of the plurality of avatars; means for selecting a display avatar of the plurality of avatars based on a first condition of the one or more conditions, wherein the first condition is associated with one or more characteristics associated with the first user; and means for outputting the display avatar for presentation to a second user, wherein the display avatar is to be presented in accordance with the one or more characteristics associated with the first user.

Aspect 51: The apparatus of Aspect 50, further comprising means for performing operations according to any of Aspects 2 to 24, and/or any of Aspects 26 to 47.

What is claimed is:

1. An apparatus for user persona management, the apparatus comprising:
at least one memory; and
one or more processors coupled to the at least one memory, the one or more processors configured to:
identify a profile associated with a first user, wherein the profile includes data defining a plurality of avatars that each represent the first user and one or more conditions for displaying respective avatars of the plurality of avatars;

select a first display avatar of the plurality of avatars based on a first condition of the one or more conditions, wherein the first condition is associated with one or more characteristics associated with the first user;

output the first display avatar for presentation to a second user, wherein the first display avatar is to be presented in accordance with the one or more characteristics associated with the first user; and output a second display avatar of the plurality of avatars for presentation to a third user while the first display avatar is presented to the second user.

2. The apparatus of claim 1, wherein the one or more characteristics associated with the first user includes an identity of the second user that the first display avatar is to be presented to, wherein the first condition corresponds to whether the identity of the second user is identified in a predetermined data structure corresponding to the first user.

3. The apparatus of claim 1, wherein the one or more characteristics associated with the first user includes a category of relationship between the second user that the first display avatar is to be presented to and the first user, wherein the first condition corresponds to whether the category of relationship is identified in a predetermined data structure corresponding to the first user.

4. The apparatus of claim 1, wherein the one or more characteristics associated with the first user includes a location of the first user in an environment, wherein the first condition corresponds to whether the location of the first user in the environment falls within at least one of a predetermined area, a predetermined area type, or a predetermined environment type in the environment identified in a predetermined data structure corresponding to the first user.

5. The apparatus of claim 1, wherein the one or more characteristics associated with the first user includes an activity performed by the first user, wherein the first condition corresponds to whether the activity is identified in a predetermined data structure corresponding to the first user.

6. The apparatus of claim 1, wherein, to identify the profile associated with the first user, the one or more processors are configured to identify the profile associated with the first user based on one or more communications from a user device associated with the first user.

7. The apparatus of claim 1, wherein the one or more processors are configured to:

identify a second profile associated with a fourth user, wherein the second profile includes data defining a second plurality of avatars that each represent the fourth user and a second set of one or more conditions for displaying respective avatars of the second plurality of avatars;

select a third display avatar of the second plurality of avatars based on a second condition of the second set of one or more conditions, wherein the second condition is associated with a second set of one or more characteristics associated with the second user; and output the third display avatar for presentation to the second user, wherein the third display avatar is to be presented in accordance with the second set of one or more characteristics associated with the fourth user.

8. The apparatus of claim 1, wherein the one or more processors are configured to:

identify a second profile associated with a fourth user, wherein the second profile includes data defining a second plurality of avatars that each represent the fourth user and a second set of one or more conditions for displaying respective avatars of the second plurality of avatars;

select a third display avatar of the second plurality of avatars based on none of the second set of one or more conditions being met; and output the third display avatar for presentation to the second user.

9. The apparatus of claim 1, wherein the one or more processors are configured to:

receive an image of an environment;

detect at least a portion of the first user in the image, wherein the one or more processors are configured to identify the profile associated with the first user based on at least the portion of the first user being detected in the image; and generate a modified image at least in part by modifying the image to use the first display avatar in place of at least the portion of the first user in the image according to the one or more characteristics of the first user, wherein, to output the first display avatar for presentation to the second user, the one or more processors are configured to output the modified image for presentation to the second user.

10. The apparatus of claim 9, wherein at least a portion of the environment in the image includes one or more virtual elements.

11. The apparatus of claim 1, wherein the one or more processors are configured to:

before outputting the first display avatar for presentation to the second user, modify the first display avatar based on one or more display preferences associated with the second user.

12. The apparatus of claim 1, wherein the one or more processors are configured to:

select a third display avatar of the plurality of avatars based on a change from the first condition to a second condition of the one or more conditions; and transition from outputting the first display avatar for presentation to the second user to outputting the third display avatar for presentation to the second user, wherein the third display avatar is to be presented in accordance with the one or more characteristics associated with the first user.

13. The apparatus of claim 1, wherein the one or more processors are configured to:

generate the first display avatar before outputting the first display avatar for presentation to the second user, wherein, to generate the first display avatar, the one or more processors are configured to provide one or more inputs associated with the first user to a trained machine learning model that generates the first display avatar based on the one or more inputs associated with the first user.

14. The apparatus of claim 1, wherein the one or more processors are configured to:

identify a facial expression of the first user; and modify the first display avatar to apply the identified facial expression to the first display avatar before outputting the first display avatar for presentation to the second user.

15. The apparatus of claim 1, further comprising:
a display, wherein the one or more processors are configured to cause the first display avatar to be displayed using at least the display.

16. The apparatus of claim 1, further comprising:
a communication interface, wherein the one or more processors are configured to transmit at least the first display avatar to at least a user device associated with the second user using at least the communication interface.

17. The apparatus of claim 1, wherein the apparatus includes at least one of a head-mounted display (HMD), a mobile handset, or a wireless communication device.

18. The apparatus of claim 1, wherein the apparatus includes one or more network servers, wherein the one or more processors are configured to output the first display avatar for presentation to the second user at least in part by transmitting the first display avatar to a user device associated with the second user.

19. The apparatus of claim 1, wherein the one or more processors are configured to:
select the second display avatar based on the one or more conditions.

20. The apparatus of claim 19, wherein the one or more processors are configured to:
select second display avatar based on the first condition of the one or more conditions.

21. A method for user persona management, the method comprising:
identifying a profile associated with a first user, wherein the profile includes data defining a plurality of avatars that each represent the first user and one or more conditions for displaying respective avatars of the plurality of avatars;
selecting a first display avatar of the plurality of avatars based on a first condition of the one or more conditions, wherein the first condition is associated with one or more characteristics associated with the first user;
outputting the first display avatar for presentation to a second user, wherein the first display avatar is to be presented in accordance with the one or more characteristics associated with the first user; and
outputting a second display avatar of the plurality of avatars for presentation to a third user while the first display avatar is presented to the second user.

22. The method of claim 21, wherein the one or more characteristics associated with the first user includes an identity of the second user that the first display avatar is to be presented to, wherein the first condition corresponds to whether the identity of the second user is identified in a predetermined data structure corresponding to the first user.

23. The method of claim 21, wherein the one or more characteristics associated with the first user includes a category of relationship between the second user that the first display avatar is to be presented to and the first user, wherein the first condition corresponds to whether the category of relationship is identified in a predetermined data structure corresponding to the first user.

24. The method of claim 21, wherein the one or more characteristics associated with the first user includes a location of the first user in an environment, wherein the first condition corresponds to whether the location of the first user in the environment falls within at least one of a predetermined area, a predetermined area type, or a predetermined environment type in the environment identified in a predetermined data structure corresponding to the first user.

25. The method of claim 21, wherein the one or more characteristics associated with the first user includes an activity performed by the first user, wherein the first condition corresponds to whether the activity is identified in a predetermined data structure corresponding to the first user.

26. The method of claim 21, further comprising:
identifying a second profile associated with a fourth user, wherein the second profile includes data defining a second plurality of avatars that each represent the fourth user and a second set of one or more conditions for displaying respective avatars of the second plurality of avatars;
selecting a third display avatar of the second plurality of avatars based on a second condition of the second set of one or more conditions, wherein the second condition is associated with a second set of one or more characteristics associated with the second user; and
outputting the third display avatar for presentation to the second user, wherein the third display avatar is to be presented in accordance with the second set of one or more characteristics associated with the fourth user.

27. The method of claim 21, further comprising:
before outputting the first display avatar for presentation to the second user, modifying the first display avatar based on one or more display preferences associated with the second user.

28. The method of claim 21, further comprising:
selecting a third display avatar of the plurality of avatars based on a change from the first condition to a second condition of the one or more conditions; and
transitioning from outputting the first display avatar for presentation to the second user to outputting the third display avatar for presentation to the second user, wherein the third display avatar is to be presented in accordance with the one or more characteristics associated with the first user.

29. The method of claim 21, further comprising:
generating the first display avatar before outputting the first display avatar for presentation to the second user, wherein generating the first display avatar includes providing one or more inputs associated with the first user to a trained machine learning model that generates the first display avatar based on the one or more inputs associated with the first user.

30. The method of claim 21, further comprising:
identifying a facial expression of the first user; and
modifying the first display avatar to apply the identified facial expression to the first display avatar before outputting the first display avatar for presentation to the second user.

31. The method of claim 21, further comprising:
causing the first display avatar to be displayed using a display.

32. The method of claim 21, further comprising:
causing the first display avatar to be transmitted to at least a user device associated with the second user using at least a communication interface.

* * * * *